United States Patent
Tsujiguchi

(10) Patent No.: US 10,122,888 B2
(45) Date of Patent: Nov. 6, 2018

(54) INFORMATION PROCESSING SYSTEM, TERMINAL DEVICE AND METHOD OF CONTROLLING DISPLAY OF SECURE DATA USING AUGMENTED REALITY

(71) Applicant: Yuuichiroh Tsujiguchi, Kanagawa (JP)

(72) Inventor: Yuuichiroh Tsujiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/292,622

(22) Filed: Oct. 13, 2016

(65) Prior Publication Data
US 2017/0118374 A1     Apr. 27, 2017

(30) Foreign Application Priority Data

Oct. 26, 2015 (JP) .................. 2015-209696
May 2, 2016 (JP) .................. 2016-092602

(51) Int. Cl.
| H04N 1/32 | (2006.01) |
| G06T 19/00 | (2011.01) |
| H04N 1/00 | (2006.01) |
| G06F 3/14 | (2006.01) |
| G06K 9/20 | (2006.01) |

(Continued)

(52) U.S. Cl.
CPC .......... *H04N 1/32133* (2013.01); *G06F 3/14* (2013.01); *G06F 3/147* (2013.01); *G06F 21/6209* (2013.01); *G06F 21/84* (2013.01); *G06K 9/2063* (2013.01); *G06T 19/006* (2013.01); *G09G 5/026* (2013.01); *G09G 5/14* (2013.01); *H04N 1/00251* (2013.01); *H04N 1/32208* (2013.01);

(Continued)

(58) Field of Classification Search
CPC combination set(s) only.
See application file for complete search history.

(56) References Cited

U.S. PATENT DOCUMENTS

| 2004/0117738 A1 | 6/2004 | Anisimovich et al. |
| 2007/0019222 A1* | 1/2007 | Oda ............... G06F 3/1204 358/1.13 |

(Continued)

FOREIGN PATENT DOCUMENTS

| CN | 102147864 | 8/2011 |
| CN | 103809743 | 5/2014 |

(Continued)

*Primary Examiner* — Barbara Reinier
(74) *Attorney, Agent, or Firm* — Harness, Dickey & Pierce P.L.C.

(57) ABSTRACT

An information processing system includes a server, and a terminal device communicable with the server via a network. The terminal device includes a display, an image capturing device to capture a marker image and a first image formed on a recording medium, the marker image indicating a condition of displaying information on the display, and circuitry to extract an identifier of the marker image from the captured marker image, transmit identification information of the terminal device or user and the extracted identifier of the captured marker image to the server, receive data of a second image associated with the identification information of the terminal device or user and the identifier of the marker image from the server, and superimpose the second image over the first image to cause the display to display the second image and the first image while the recording medium is being captured.

20 Claims, 22 Drawing Sheets

(51) Int. Cl.
*G06F 3/147* (2006.01)
*G06F 21/62* (2013.01)
*G06F 21/84* (2013.01)
*G09G 5/02* (2006.01)
*G09G 5/14* (2006.01)

(52) U.S. Cl.
CPC .. *G06F 2221/2113* (2013.01); *G09G 2340/12* (2013.01); *G09G 2358/00* (2013.01)

(56) References Cited

U.S. PATENT DOCUMENTS

| | | |
|---|---|---|
| 2014/0126782 A1 | 5/2014 | Takai et al. |
| 2014/0168714 A1 | 6/2014 | Sawayanagi et al. |
| 2015/0070714 A1 | 3/2015 | Sadasue et al. |
| 2015/0138595 A1* | 5/2015 | Sugimoto ............ H04N 1/0044 358/1.15 |
| 2015/0180938 A1* | 6/2015 | Ruppin ................... G06F 21/10 726/30 |
| 2015/0200922 A1* | 7/2015 | Eschbach ................ H04L 63/08 358/1.14 |
| 2015/0371445 A1* | 12/2015 | Karrer Walker ............................ G06F 17/30011 345/632 |
| 2016/0255264 A1* | 9/2016 | Russell ................... G06F 3/147 348/226.1 |

FOREIGN PATENT DOCUMENTS

| | | |
|---|---|---|
| CN | 103888695 | 6/2014 |
| CN | 104660842 | 5/2015 |
| JP | 2013-026922 | 2/2013 |
| JP | 2015-056771 | 3/2015 |

* cited by examiner

MARKER COORDINATE SYSTEM

SCREEN COORDINATE SYSTEM

CAPTURED ORIGINAL IMAGE

AR SUPERIMPOSED IMAGE

AR SUPERIMPOSED IMAGE APPLYING AR MARKER RATIO

AR MARKER UNDETECTABLE IMAGE

AR MARKER-ADDING PATTERN

AR MARKER-OMITTED PATTERN

FIG. 9
| TERMS | CLASSIFICATION | AR MARKER IMAGE |
|---|---|---|
| HOSPITAL, MEDICAL, SURGERY, INTERNAL MEDICINE | MEDICALS | 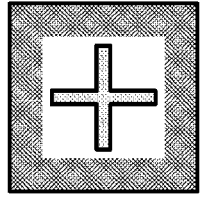 |
| ANIMAL, DOG, CAT | ANIMALS | 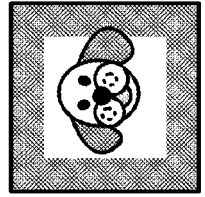 |
| CAR, BUS | VEHICLES | 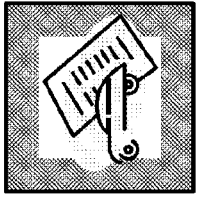 |
| .. | .. | .. |

FIG. 12

AR INFORMATION GENERATION SCREEN

■ AR INFORMATION GENERATION

■ MARKER SELECTION :

MARKER: [WITH DISPLAY ▼]

MAKER PLACEMENT: VERTICAL: [yy1] – [yy2] HORIZONTAL: [xx1] – [xx2] AUTOMATIC REDUCTION: ☑

■ NON-DISPLAY INFORMATION FOR EACH SECURITY LEVEL

SECURITY A: VERTICAL: [yy3] – [yy4] HORIZONTAL: [xx3] – [xx4] ROTATION: [zz1]
SECURITY B: VERTICAL: [yy5] – [yy6] HORIZONTAL: [xx5] – [xx6] ROTATION: [zz2]
SECURITY C: VERTICAL: [yy7] – [yy8] HORIZONTAL: [xx7] – [xx8] ROTATION: [zz3]
SECURITY D: VERTICAL: [yy9] – [yy10] HORIZONTAL: [xx9] – [xx10] ROTATION: [zz4]

AR MARKER ADDING — 410

400 — [?] [X]

300a

SAMPLE SECURITY DOCUMENT

SECURITY LEVEL A

SECURITY LEVEL B

SECURITY LEVEL C

SECURITY LEVEL D

200

OUTPUT IMAGE

CANCEL    OK — 420

430

INFORMATION PROCESSING SYSTEM, TERMINAL DEVICE AND METHOD OF CONTROLLING DISPLAY OF SECURE DATA USING AUGMENTED REALITY

CROSS-REFERENCE TO RELATED APPLICATION

This application claims priority pursuant to 35 U.S.C. § 119(a) to Japanese Patent Application Nos. 2015-209696, filed on Oct. 26, 2015, and 2016-092602, filed on May 2, 2016 in the Japan Patent Office, the disclosure of which are incorporated by reference herein in their entirety.

BACKGROUND

Technical Field

This disclosure relates to an information processing system, a terminal device and a method of processing data.

Background Art

Recently, the augmented reality (AR) technology has been used to provide supplemental information to the real world that users of smart devices see through the smart devices. For example, the AR technology can be applied to an information processing system having a smart device and an image forming apparatus, in which the image forming apparatus prints information such as an image on a sheet, and then a user uses the smart device to capture the image on the sheet. When the smart device captures the image on the sheet, various information as can be displayed on the smart device to provide various information to the user. The information may be, for example, information such as frequently asked questions (FAQ), assistance in cancelling of an error or an installation of the image forming apparatus, which can be viewed by the user through the smart device.

SUMMARY

As one aspect of the present invention, an information processing system is devised. The information processing system includes a server, and a terminal device communicable with the server via a network. The terminal device includes a display, an image capturing device to capture a marker image and a first image formed on a recording medium, the marker image indicating a condition of displaying information on the display, and circuitry to extract an identifier of the marker image from the marker image captured by the image capturing device, transmit the extracted identifier of the captured marker image and at least one of identification information for identifying the terminal device and identification information for identifying a user of the terminal device to the server, receive data of a second image associated with the identifier of the marker image and at least one of the identification information of the terminal device and the identification information of the user of the terminal device from the server, the data of second image variably set depending on at least one of an information clearance level of the terminal device and an information clearance level of the user of the terminal device, and superimpose the second image over the first image to cause the display to collectively display the second image and the first image while the recording medium is being captured by the image capturing device.

As another aspect of the present invention, a terminal device communicable with a server via a network is devised. The terminal device includes a display, an image capturing device to capture a marker image and a first image formed on a recording medium, the marker image indicating a condition of displaying information on the display, and circuitry to extract an identifier of the marker image from the marker image captured by the image capturing device, transmit the extracted identifier of the captured marker image and at least one of identification information for identifying the terminal device and identification information for identifying a user of the terminal device to the server, receive data of a second image associated with the identifier of the marker image and at least one of the identification information of the terminal device and the identification information of the user of the terminal device from the server, the data of second image variably set depending on at least one of an information clearance level of the terminal device and an information clearance level of the user of the terminal device, and superimpose the second image over the first image to cause the display to collectively display the second image and the first image while the recording medium is being captured by the image capturing device.

As another aspect of the present invention, a method of processing data by a terminal device communicable with a server via a network is devised. The method comprising includes capturing a marker image and a first image formed on a recording medium, the marker image indicating a condition of displaying information on a display, extracting an identifier of the marker image from the marker image captured by the capturing step, transmitting the extracted identifier of the captured marker image and at least one of identification information for identifying the terminal device and identification information for identifying a user of the terminal device to the server, receiving data of a second image associated with the identifier of the marker image and at least one of the identification information of the terminal device and the identification information of the user of the terminal device from the server, the data of second image variably set depending on at least one of an information clearance level of the terminal device and an information clearance level of the user of the terminal device; and superimposing the second image over the first image to cause the display to collectively display the second image and the first image while the recording medium is being captured.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is an example of a classification table storing corresponding terms, classification of corresponding terms, and AR marker images of the corresponding terms of the first example embodiment;

FIG. 12 illustrates an example of an AR information generation screen displayable on a display of the host PC of the first example embodiment;

Figure 1:
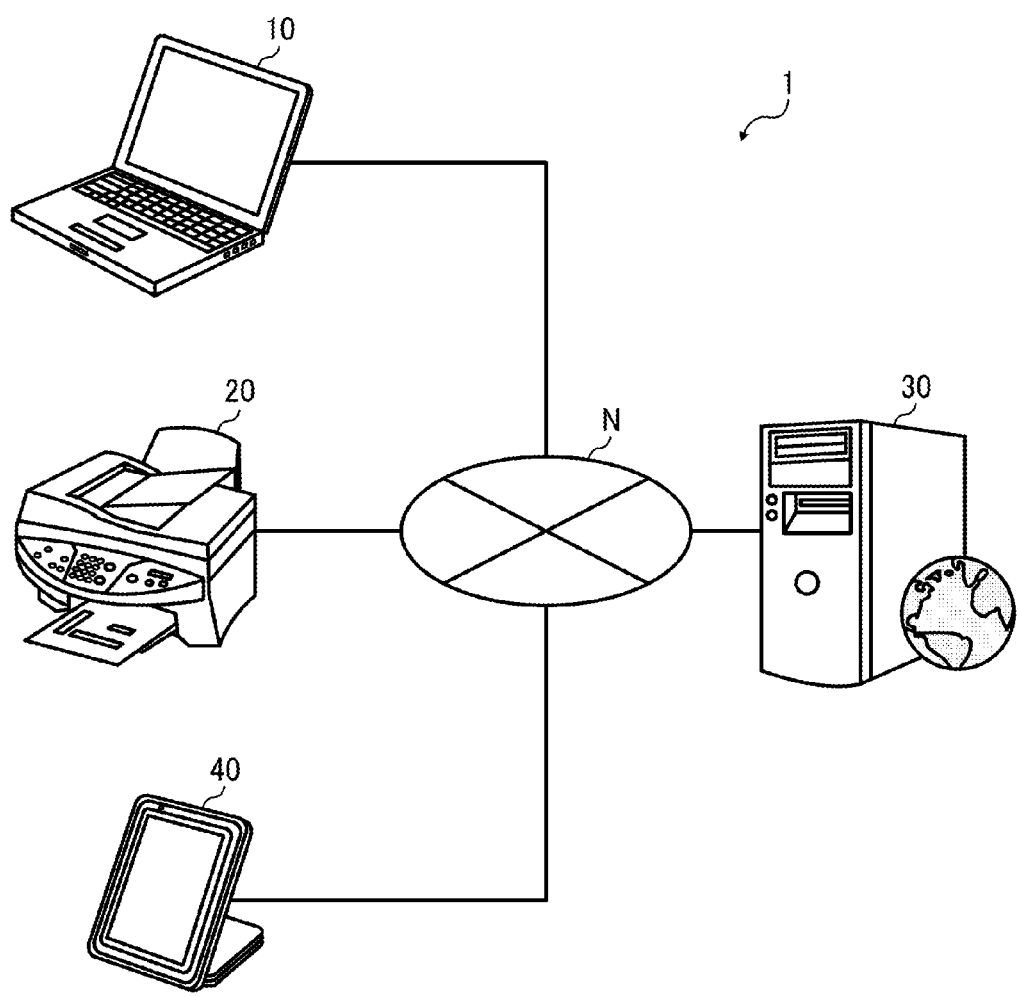
FIG. 1 illustrates a schematic configuration diagram of an information processing system of a first example embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments of the present invention are described hereinafter.

A description is given of an information processing system of example embodiments of the present invention with reference to drawings. The information processing system has a configuration that can superimpose a second image, associated with an information clearance level of a user, over a first image formed on a recording medium while capturing a face of the recording medium, and display the second image and the first image collectively on a display while the recording medium is being captured to enhance a security level of information.

Specifically, the information processing system includes, for example, a server, and a terminal device communicable with the server via a network.

The terminal device includes a display, an image capture and circuitry. The image capture captures a marker image and a first image formed on a recording medium, in which the marker image indicates a condition of displaying information on the display. The circuitry extracts an identifier of the marker image from the marker image captured by the image capture, transmits the extracted identifier of the captured marker image and at least one of identification information for identifying the terminal device and identification information for identifying a user of the terminal device to the server, receives data of a second image associated with the identifier of the marker image and at least one of the identification information of the terminal device and the identification information of the user of the terminal device from the server, the data of second image variably set depending on at least one of an information clearance level of the terminal device and an information clearance level of the user of the terminal device, and superimposes the second image over the first image on the display to view the second image and the first image collectively on the display while the recording medium is being captured by the image capture.

With employing the above mentioned configuration, the second image associated with the information clearance level of the user can be superimposed over the first image formed on the recording medium to view the second image and the first image collectively on the display while the recording medium is being captured by the image capture, with which the security level of information can be enhanced. A description is given of the information processing system in detail with reference to drawings.

A description is given of the augmented reality (AR) technology. The AR technology is a variant of the virtual reality (VR) technology. When the AR technology is applied to the real world, information can be added, deleted, emphasized, and/or reduced from the-real world, with which the real world viewed by a person is augmented.

As to the VR technology, the artificially-configured sense of reality replaces the reality. As to the AR technology, a part of real world is altered. For example, when the VR technology is used, a virtual tea pot is placed on a virtual table in a virtual room, and a person sees an image of the virtual tea pot placed on the virtual table as a virtual image as if the person is seeing the tea pot actually. When the AR technology is used, information of a virtual tea pot is set on a real table in a real room in the real world, and an image of the virtual tea pot placed on the real table in the room is presented to a person in the real world.

The AR technology adds digital information to the real world so that the information to be recognized by persons is augmented by adding the information, and thereby the AR technology can provide the augmented reality to the real world. Since the real world is used as information source, the AR technology may require a real time processing. The AR technology may further require an interaction of virtual object image and the real world or real object. For example, as to visual factors such as lighting, shadow, contact, and hiding processes become technological issue. Computers can augment information of sensory organs and somatosensory of persons such as visual sensory, auditory sensory, and tactile sensory in the real world. As to the VR technology, reality of virtual object image to be perceived by persons becomes an issue. As to the AR technology, positions in the real world and relation with context of objects become an issue, in which information of places and objects in the real world can be augmented by adding, for example, characters and audio.

Typically, augmented information can be acquired and displayed by using the VR technology devices such as a head mount display for displaying visual information. Further, portable terminal devices such as cell phones having screens can be used to present augmented information to assist works in the real world. For example, portable terminal devices can be used to provide road guide information to drivers, and portable terminal devices can be used to provide technology information to maintenance engineers of airplanes, copiers and so on. Further, portable terminal devices can be used to provide operation information in the medical fields.

When the AR system is used for consumer service, the AR system can be configured by using the image recognition method such as ARToolKit. When a two dimensional code pattern or still image used as an "AR marker" is captured by a digital camera, 3D computer graphics animation associated with the AR marker can be the synthesized and displayed real time, or contents associated with the AR marker such as still image can be displayed.

A description is given of the implementation of AR technology. The AR technology can be implemented using two methods. One method is known as the "location base AR," in which information is presented by using the position information acquired from GPS. Another method is known as the "vision base AR," in which information is presented by recognizing and analyzing the real world by using the image recognition and space recognition technologies.

First Example Embodiment

A description is given of an information processing system of a first example embodiment with reference to FIG. 1.
(Information Processing System)

Figure 2A:
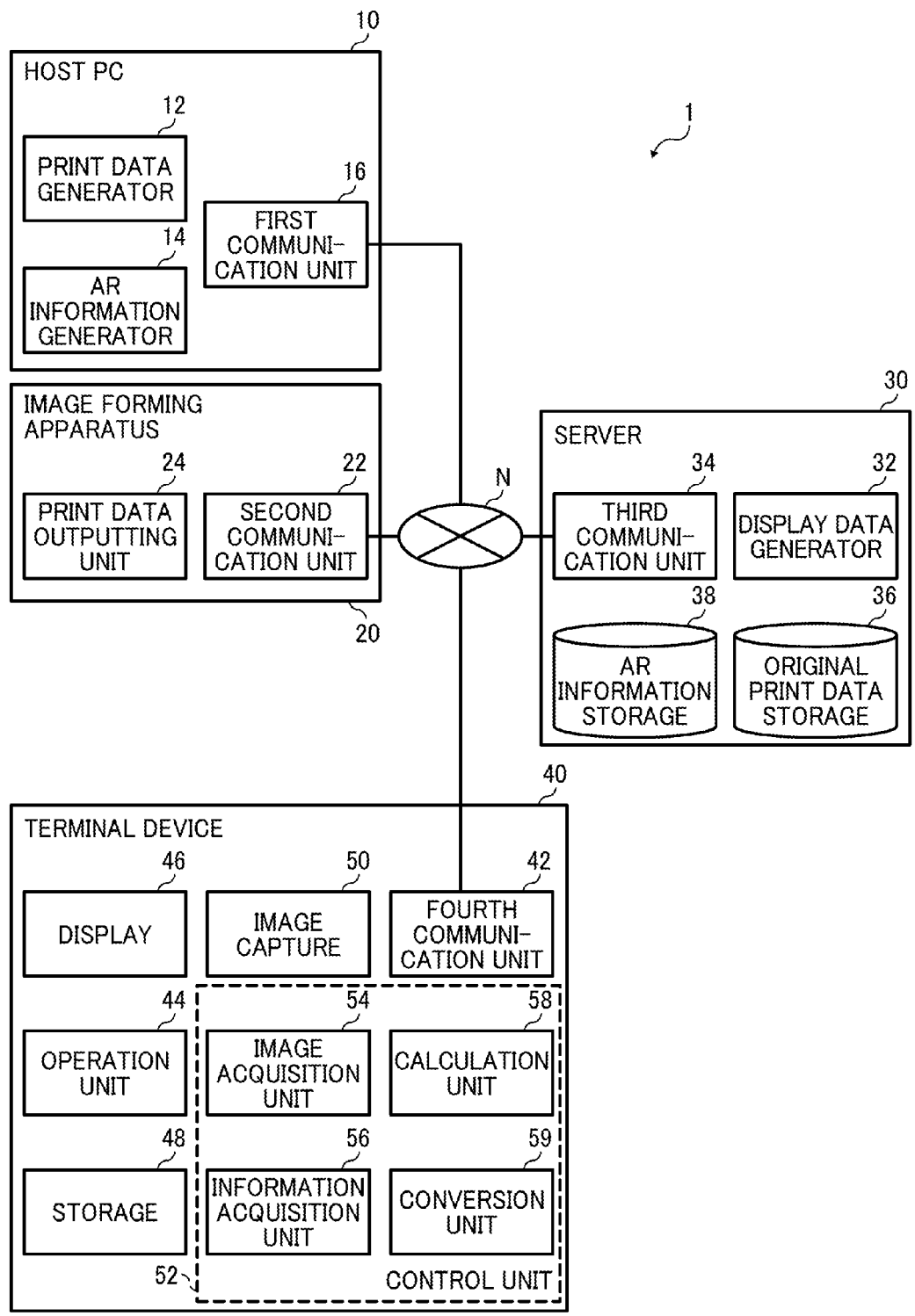
FIG. 2A is a functional block diagram of the information processing system of the first example embodiment.
Figure 2B:
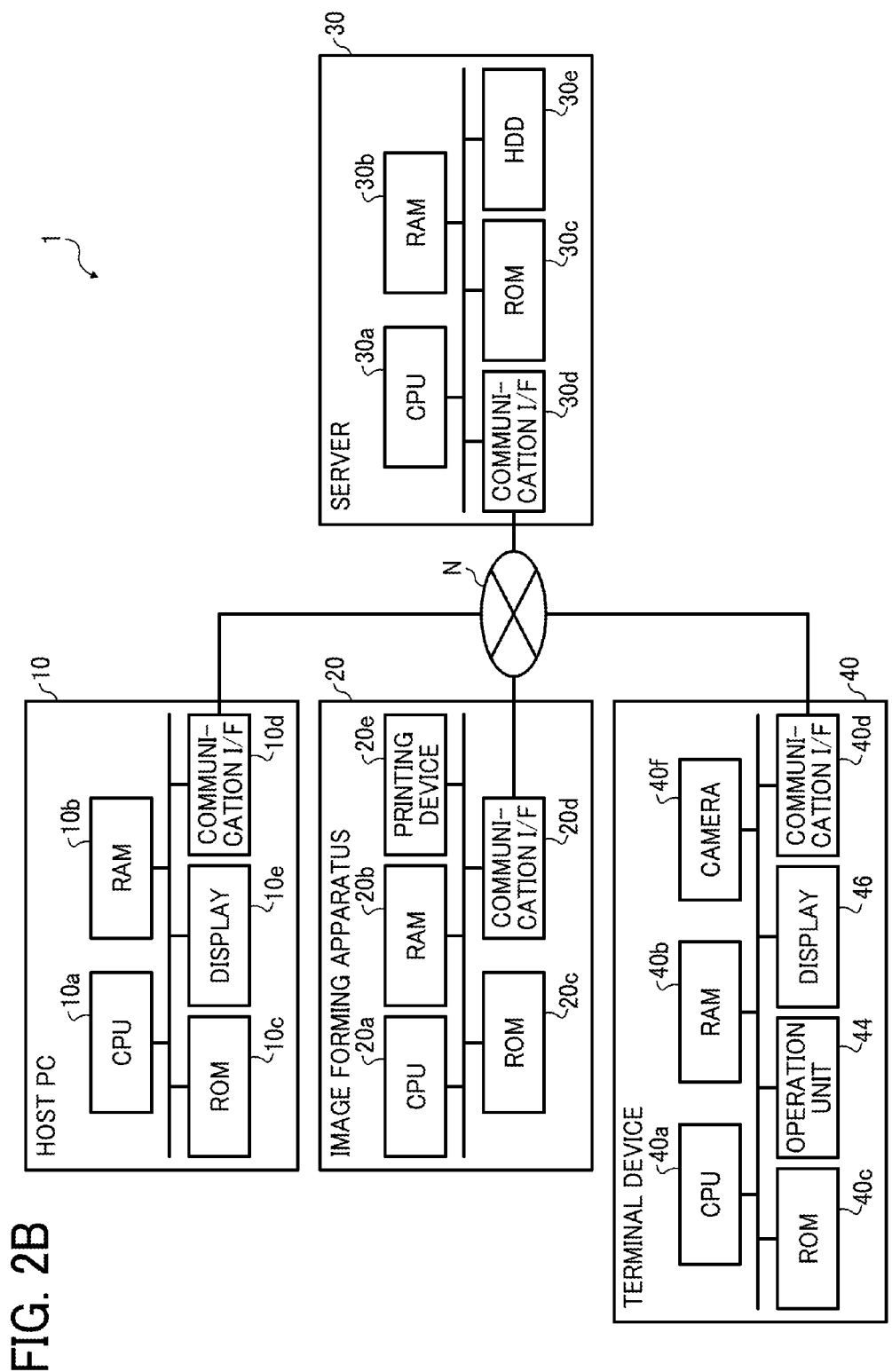
FIG. 2B is a block diagram of a hardware configuration of the information processing system 1 of the first example embodiment.

FIG. 1 illustrates a schematic configuration diagram of an information processing system 1 of the first example embodiment of the present invention. The information processing system 1 includes, for example, a host personal computer (PC) 10, an image forming apparatus 20, a server 30, and a terminal device 40 such as a smart device (e.g. smart phone), which can be connected or coupled with one to another via a network N such as the Internet and/or local area network (LAN). Further, the number of the host PC 10, image forming apparatus 20, server 30, and terminal device 40 is not limited to one, but can be any numbers. The host PC 10 is an example of information processing apparatuses, the image forming apparatus 20 is an example of image forming apparatuses, the server 30 is an example of information processing apparatuses, and the terminal device 40 is an example of information processing apparatuses, A description is given of a functional block diagram of the information processing system 1 with reference to FIGS. 2A and 2B FIG. 2A is a functional block diagram of the information processing system 1 of the first example embodiment. FIG. 2B is a block diagram of a hardware configuration of the information processing system 1 of the first example embodiment.
(Host PC)

As illustrated in FIG. 2A, the host PC 10 includes, for example, a print data generator 12, an AR information generator 14, and a first communication unit 16. The host PC 10 receives various instructions from a user such as processing of print data (e.g. deleting of classified data), AR display condition information, designation of to-be used AR marker, designation of printing condition designation, and print instruction. The print data generator 12 adds an AR marker to the print data based on an analysis result of the printing condition and the print data.

The AR information generator 14 generates AR information that correlates pre-processing original print data and AR display condition information indicating a security level. The first communication unit 16 transmits the print data to the image forming apparatus 20 via the network N.

Further, the first communication unit 16 transmits the original print data and AR information to the server 30 via the network N. The to-be used AR marker can be selected and designated from a plurality of AR markers. If the AR marker is not designated, a default AR marker can be used. As illustrated in FIG. 2B, the hardware configuration of the host PC 10 includes, for example, a central processing unit (CPU) 10*a*, a read only memory (ROM) 10*b*, a random access memory (RAM) 10*c*, a communication interface (UF) 10*d*, and a display 10*e* to devise the capabilities of the host PC 10.

(Image Forming Apparatus)

As illustrated in FIG. 2A, the image forming apparatus 20 includes, for example, a second communication unit 22, a print data outputting unit 24. The second communication unit 22 receives the print data from the host PC 10 via the network N. The print data outputting unit 24 prints the print data instructed from the host PC 10 on a recording medium. As illustrated in FIG. 2B, the hardware configuration of the image forming apparatus 20 includes, for example, a central processing unit (CPU) 30*a*, a read only memory (ROM) 20*b*, a random access memory (RAM) 20*c*, a communication interface (UF) 20*d*, and a printing device 20*e* to devise the capabilities of the image forming apparatus 20.

(Server)

As illustrated in FIG. 2A the server 30 includes, for example, a display data generator 32, a third communication unit 34, an original print data storage 36, and an AR information storage 38. The display data generator 32 processes the original print data to generate processed data based on the AR marker information and AR information. The third communication unit 34 transmits the processed data to the terminal device 40 via the network N. The original print data storage 36 stores the original data, the AR marker, and the security level. The AR information storage 38 includes, for example, an identifier table, a security table, and a comparison table that stores AR information associated with each of identifiers and each of user IDs. The user IDs stored in the AR information storage 38 can be re-writable. As illustrated in FIG. 2B, the hardware configuration of the server 30 includes, for example, a central processing unit (CPU) 30*a*, a read only memory (ROM) 30*b*, a random access memory (RAM) 30*c*, a communication interface (UF) 30*d*, and a hard disk drive (HDD) 30*e* to devise the capabilities of the server 30.

(Terminal Device)

The terminal device 40 includes, for example, a fourth communication unit 42, an operation unit 44, a display 46, a storage 48, an image capture 50, and a control unit 52. The fourth communication unit 42 communicates information with an external apparatus such as the host PC 10 via the network N, and the fourth communication unit 42 can be implemented or devised by a communication device such as the network interface card (NIC).

The operation unit 44 is used to input various information required for application software by a user operation. The operation unit 44 can be implemented or devised by an input device such as a touch panel and a key switch. The display 46 displays various screen images, and the display 46 can be implemented or devised by a display such as a liquid crystal display and a touch panel display. The storage 48 stores various application software programs executable at the terminal device 40, and data used for various processing performed at the terminal device 40. The storage 48 can be implemented or devised by a memory that can store information magnetically, optically, or electrically. The storage 48 can be, for example, a hard disk drive (HDD), a solid state drive (SSD), a memory card, optical disk, and a random access memory (RAM). The image capture 50 captures or scans a document optically under the instruction of the control unit 52 to generate image data of document. The image capture 50 is an example of image scanners and image capturing devices. The image capture 50 can be implemented or devised, for example, by a digital camera.

The control unit 52 controls internal units of the terminal device 40. The control unit 52 can be implemented or devised by a central processing unit (CPU) and/or large scale integration (LSI). The control unit 52 includes, for example, a CPU, and a read only memory (ROM), and a random access memory (RAM). The CPU reads out an operating system (OS) from the ROM and loads on the RAM to activate OS. The CPU reads out programs such as process modules from the ROM and executes various processing under the management of OS. Further, the control unit 52 includes, for example, an image acquisition unit 54, an information acquisition unit 56, a calculation unit 58, and a conversion unit 59. The image acquisition unit 54 acquires an image including an AR marker used for augmented reality (AR) processing. The image acquisition unit 54 scans a recording medium printed with an AR marker (e.g., document) optically to acquire the image including the AR marker. Further, the image acquisition unit 54 can acquire the image including the AR marker from an external apparatus such as the host PC 10, which is an example of information processing apparatuses, connected or coupled via the network N.

As illustrated in FIG. 2B, the hardware configuration of the terminal device 40 includes, for example, a central processing unit (CPU) 40*a*, a read only memory (ROM) 40*b*, a random access memory (RAM) 40*c*, a communication interface (UF) 40*d*, the display 46, a camera 40*f* corresponding to the image capture 50, and the operation unit 44 to devise the capabilities of the terminal device 40.

The information acquisition unit 56 acquires first information embedded in the AR marker when by the image acquisition unit 54 acquires the AR marker included in the image. The first information embedded in the AR marker indicates a size of the AR marker in the real world before printing the image. Specifically, the information acquisition unit 56 detects the AR marker from the image acquired by the image acquisition unit 54, and acquires the first information embedded in the detected AR marker.

The calculation unit 58 calculates or estimates the relative position and posture of the camera based on coordinates of the four corners. The calculation unit 58 calculates the relative position and posture of the camera by converting coordinates of the four corners of a square set in the marker coordinate system in the three dimensional space to two dimensional camera virtual screen Sv coordinate system.

The conversion unit 59 places a three dimensional (3D) virtual object image in the marker coordinate system in the three dimensional space based on the relative position and posture of the camera and second information indicating a size of the AR marker in the real world.

(AR Marker)

Figure 3:
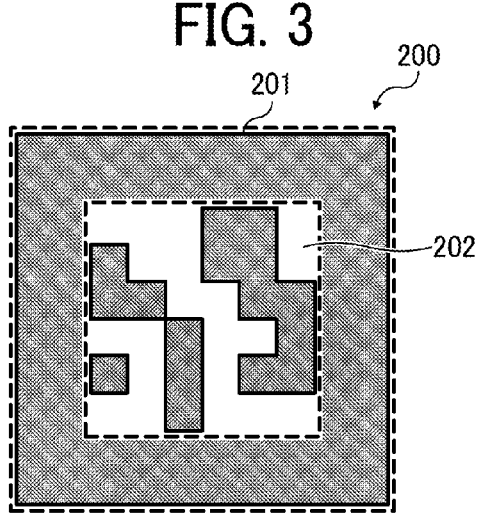
FIG. 3 illustrates an example of AR marker of the first example embodiment.

A description is given of the AR marker with reference to FIG. 3. FIG. 3 illustrates an example of the AR marker of the first example embodiment. As illustrated in FIG. 3, the AR marker 200 includes an outer region 201 and an inner region 202. The outer region 201 is used to detect the AR marker 200, and the inner region 202 is used to embed the first information. FIG. 3 illustrates the AR marker 200 having a square shape but not limited hereto. For example, the AR marker 200 can have any shapes such as a rectangular shape, a circle shape or the like as long as the shape is a detectable shape. Further, the color of the AR marker 200 may be a monochrome image in view of the image processing load, but the color of the AR marker 200 can be a multi-color image.

A description is given of processing of the information acquisition unit 56 of the terminal device 40. For example, the information acquisition unit 56 performs the binarization process to the image acquired by the image acquisition unit 54, and performs the labeling process to the binarized image, in which adjacent pixels having the same color are processed as one region to separate the binarized image into a white-pixel region and a black-pixel region. Then, the information acquisition unit 56 detects four corners of the separated black-pixel region from the contour of the image.

Since the black-pixel region having the detected four corners becomes the outer region 201 of the AR marker 200, the information acquisition unit 56 can detect the AR marker 200 from the image acquired by the image acquisition unit 54, and can acquire the first information from the inner region 202 of the AR marker 200. Further, if the shape of the AR marker 200 is the circle shape, the information acquisition unit 56 can perform the hub conversion to detect a black-pixel region configuring the circle. The first information indicates the size of the AR marker in the real world before printing the image such as before copying. Specifically, the size of the AR marker in the real world before printing the image can be defined by a combination of colors of elements configuring a given region in the AR marker. For example, in a case of the AR marker 200 of FIG. 3, the size of the AR marker in the real world before printing the image can be defined by a combination of colors of pixels configuring the inner region 202.

The inner region 202 of the AR marker 200 of FIG. 3 includes, for example, 6×6=36 pixels, and "0" is set when the color of pixel is white and "1" is set when the color of pixel is black, in which the size of the AR marker in the real world before printing the image is defined by 36-bit binary number. Among 36 bits (pixels) of the inner region 202, values of pixels at the four corners of the inner region 202 are used to detect the orientation of the AR marker 200 used as the marker image so that the AR marker 200 can be detected correctly even if the AR marker 200 is rotated into any directions such as up, down, right or left directions.

Further, among the remaining 32 bits, the first 8 bits are used as an identifier to identify a three dimensional (3D) virtual object image to be placed in the three dimensional space based on the AR marker 200 to be used for the augmented reality (AR) processing. In a case of the AR marker 200 of FIG. 3, the length of one side of the AR marker 200 can be expressed by 24 bits (pixels). When the length of one side of the AR marker 2001 is expressed with a unit of 1 (mm), the one side of the AR marker 2001 can be expressed in a range from 1 mm to 16, 777, 216 mm. However, when the check sum is added to enhance the robustness, the range of the length of one side of the AR marker 200 becomes smaller than this range.

(Operation of Terminal Device)

Figure 4:
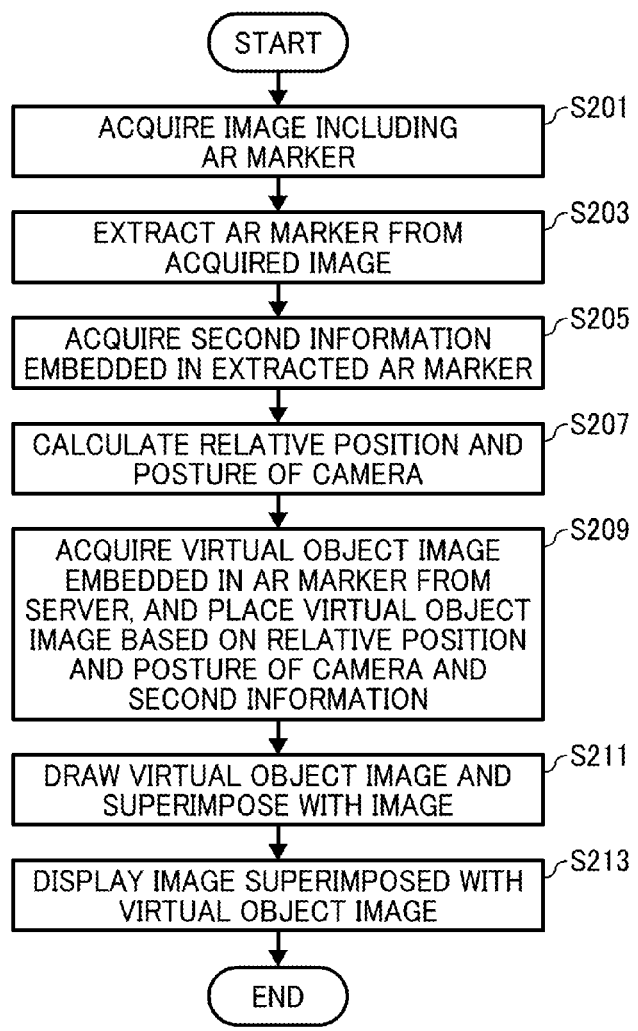
FIG. 4 is a flow chart illustrating the steps of a process of a terminal device of the first example embodiment.

A description is given of an operation of the terminal device 40 with reference to FIG. 4. FIG. 4 is a flow chart illustrating the steps of a process of the terminal device 40 of the first example embodiment. In this case, it is assumed that a document (i.e., print product) printed on a recording medium by the image forming apparatus 20 includes an image having the AR marker 200.

At step S201, the image capture 50 captures or scans the document image and the AR marker 200 printed on the recording medium, and then the image acquisition unit 54 acquires the document image.

At step S203, the information acquisition unit 56 extracts the AR marker 200 from the acquired document image. At step S205, the information acquisition unit 56 acquires the second information embedded in the extracted AR marker 200 and an identifier embedded in the AR marker 200, wherein the identifier indicates a three dimensional (3D) virtual object image.

At step S207, the calculation unit 58 calculates or estimates the relative position and posture of the camera based on the coordinates of the four corners detected at step S203 by using a the information acquisition unit 56 as above described. Specifically, the calculation unit 58 can calculate the relative position and posture of the camera by obtaining coordinates of the four corners of the square in two dimensional (camera) virtual screen Sv coordinate system converted from the coordinates of the four corners of the square placed in the marker coordinate system in the three dimensional space.

Further, the detection of the AR marker 200 and the relative position and posture of the camera can be performed by using known methods. Further, the marker coordinate system may be the global coordinates when a virtual object image is placed at last. Since it is known that the four corners exists on the same plane, when the center of the AR marker 200 is set as (x, y, z)=(0, 0, 0) in the marker coordinate system in the three dimensional space, coordinates of the four corners M0 to M3 can be expressed as M0=(−a, −a, 0), M1=(a, −a, 0), M2=(−a, a, 0), M3=(a, a, 0) as indicated in FIG. 5.

Figure 5:
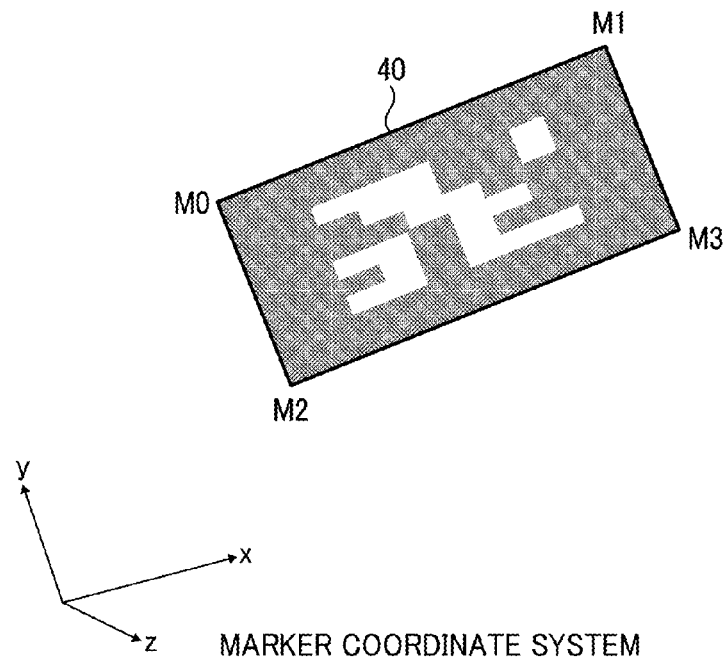
FIG. 5 illustrates an example of coordinate expression at the terminal device of the first example embodiment.

A description is given of coordinate expression at the terminal device 40 with reference to FIG. 5. FIG. 5 illustrates an example of coordinate expression at the terminal device 40 of the first example embodiment. When the conversion unit 59 performs the three dimensional coordinates conversion by conducting the desired rotation and parallel movement, the coordinates of the four corners M0 to M3 of the terminal device 40 are converted to coordinates of the three dimensional camera coordinate system. Then, by performing a perspective image projection from the three dimensional camera coordinate system to the camera virtual screen Sv, two dimensional coordinates such as M0' to M3' can be computed as indicated in FIG. 6, in which the parameters of rotation and parallel movement correspond to the relative position and posture of the camera.

Figure 6:
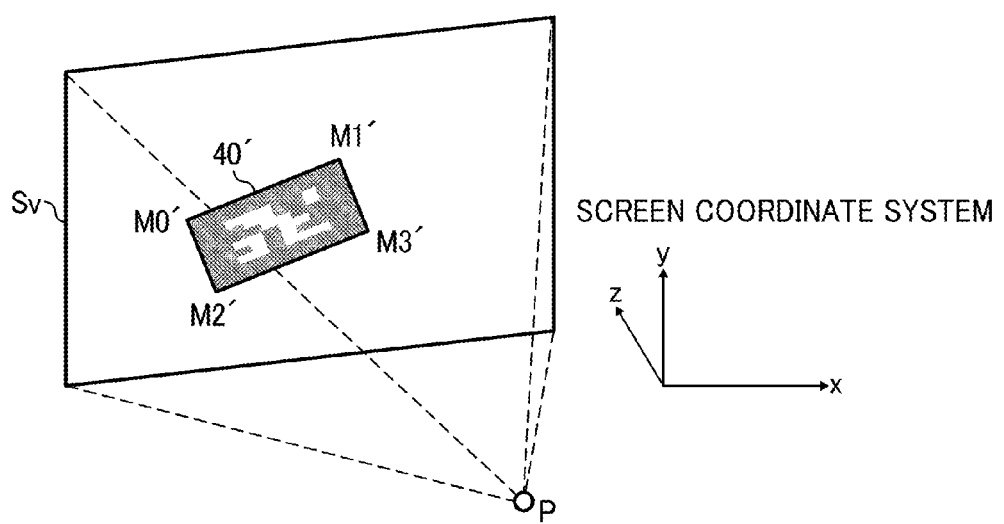
FIG. 6 illustrates an example of perspective image projection to the camera virtual screen by the terminal device of the first example embodiment.

A description is given of the perspective image projection to the camera virtual screen Sv by the terminal device 40 with reference to FIG. 6. FIG. 6 illustrates an example of perspective image projection to the camera virtual screen Sv by the terminal device 40 of the first example embodiment.

At step S209, the fourth communication unit 42 transmits the identifier of the 3D virtual object image embedded in the AR marker 200 to the server 30 via the network N. Then, the information acquisition unit 56 acquires the 3D virtual object image from the server 30 via the fourth communication unit 42.

Then, the conversion unit 59 places the 3D virtual object image in the marker coordinate system in the three dimensional space based on the relative position and posture of the camera and the second information indicating the size of the AR maker in the real world. Since the conversion unit 59 uses the second information indicating the size in the real world to place the 3D virtual object image, the 3D virtual object image can be placed with a size matched to the real world.

At step S211, the display 46 draws an image when the 3D virtual object image placed in the three dimensional space, and performs the perspective projection of the image on the screen Sv, and superimposes the drawn image with the image acquired at step S201.

For example, the terminal device 40 draws the 3D virtual object image placed in the three dimensional space over the image acquired at step S201 by using 3D programming API such as OpenGL and Direct3D. At step S213, the display 46 displays the image superimposed with the 3D virtual object image (see FIG. 7) on the display 46. Hereinafter, the 3D virtual object image may be referred to a second image to be superimposed on a first image actually formed on the recording medium. The second image is not formed on the recording medium, but the second image can be viewed when the terminal device 40 is capturing the first image actually formed on the recording medium, in which the second image is superimposed over the first image on the display 46 of the terminal device 40, and the superimposed second image and the first image can be viewed on the display 46 of the terminal device 40. Further, the first information can be related to a first size information indicating a size of the AR marker 200 before printing the image in the real world, and the second information be related to a second first size information indicating a size of the AR marker 200 after printing the image in the real world The control unit 52 performs various processing such as image editing and image synthesizing to the image captured by the image capture 50 (e.g., camera) to add some information to the image. By detecting information included in the image captured by the image capture 50 or the AR marker 200, information to be added to the image can be determined. If the adding information is information of current position, the image switching on the display can be performed.

Further, the control unit 52 repeatedly performs the above described processes from S207 to S213, for example, with a cycle of about 60 times per second, and displays the second image as the superimposed image on the display 46 with the cycle of about 60 times per second, with which the superimposed image can be displayed on the display 46 with a real time manner. The number of repeating times per second can be changed by detecting the computing capability of the CPU, which is indicated in Table 1. With employing this configuration, the number of repeating times of the process that extracts the identifier and displays AR information can be switched based on the computing capability of the CPU.

TABLE 1

| No. | Computing capability of CPU | Number of repeating times per second | Remarks |
| --- | --- | --- | --- |
| 1 | less than 1.0 GHz | 10 | |
| 2 | 1.0 GHz to less than 1.2 GHz | 20 | |
| 3 | 1.2 GHz to less than 1.5 GHz | 30 | |
| 4 | 1.5 GHz to less than 2.0 GHz | 40 | |
| 5 | 2.0 GHz to less than 2.5 GHz | 50 | |
| 6 | 2.5 GHz or more | 60 | |

Further, the parameters of Table 1 can be changed by a user. Further, the number of repeating times the process per second can be directly input by the user via the operation unit 44. With employing this configuration, the number of repeating times of the process can be switched by the user.

(Image Displayed at Terminal Device)

Figure 7A:
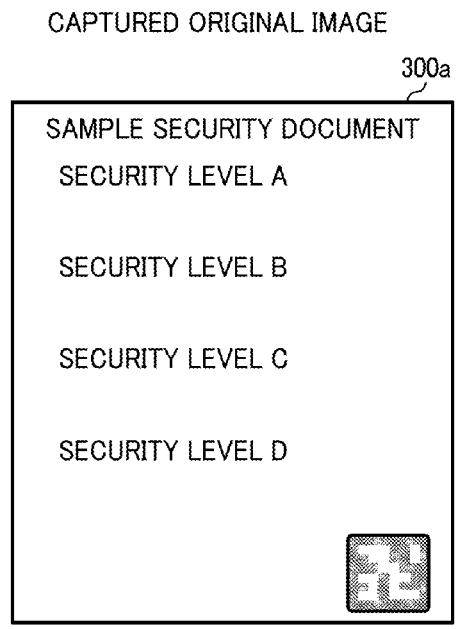
FIG. 7A illustrates an example of image displayed on a display of the terminal device when the terminal device captures an original printed image.
Figure 7B:
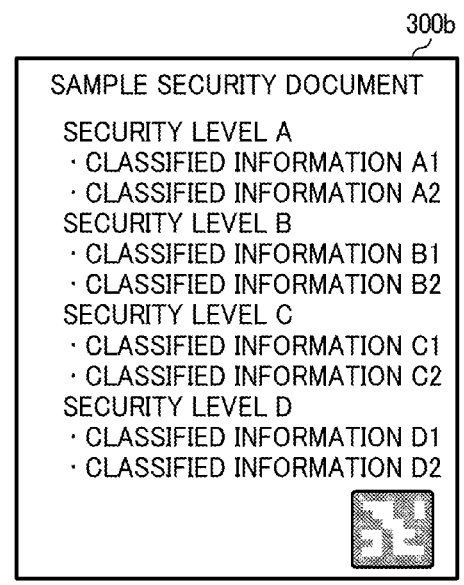
FIGS. 7B to 7D illustrate examples of images displayed on the display of the terminal device when a virtual object image is superimposed on the original printed image.
Figure 7C:
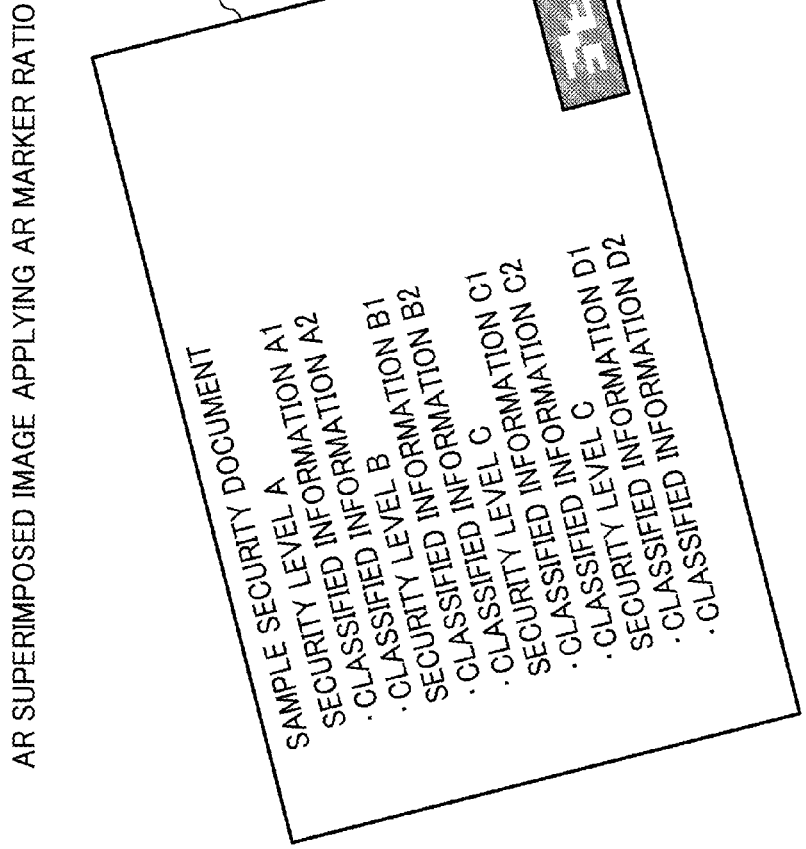
Figure 7D:
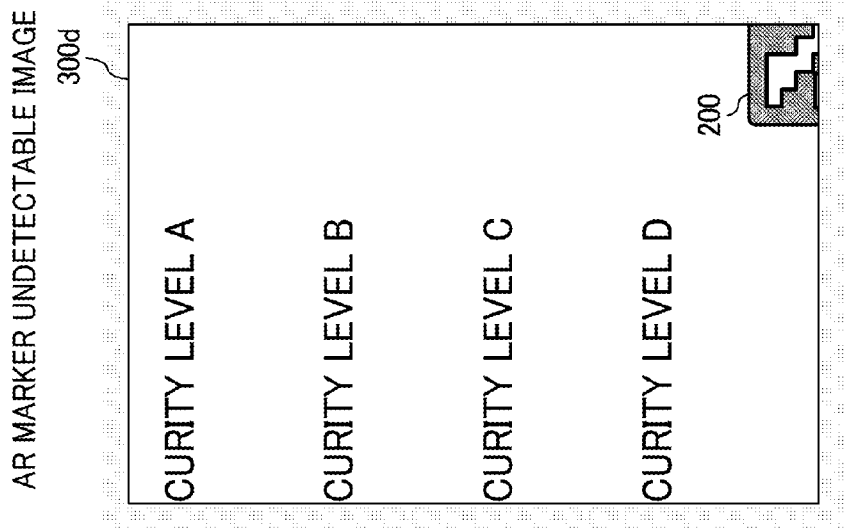

A description is given of an image displayed on the display 46 of the terminal device 40 with reference to FIGS. 7A to 7D of the first example embodiment. FIG. 7A illustrates an example of image displayed on the display 46 of the terminal device 40 when the terminal device 40 captures the printed image by using the camera as a captured original image 300a. FIGS. 7B to 7D illustrate examples of images displayed on the display 46 of the terminal device 40 when a virtual object image is superimposed on the original printed image by operating the terminal device 40.

By performing the conversion processing of FIG. 6 to the captured original image 300a indicated in FIG. 7A, the second image can be synthesized to the captured original image as indicated as an "AR superimposed image" 300b in FIG. 7B, in which superimposed characters such as "classified information A1" to "classified information D" used as the second image is superimposed over the first image FIG. 7C illustrates an "AR superimposed image applying AR marker ratio" 300c that is generated by capturing the original image by using the terminal device 40 positioned at a slanted position from the original image. By performing the conversion processing of FIG. 6, the second image is changed with the same ratio and superimposed based on the relative position and posture of the camera and the second information depending on the marker coordinates and the inclination.

For example, if the ratio of the original image and the captured original image 300a is 10:5 in the vertical direction and 10:8 in the horizontal direction, the ratio in the vertical direction becomes $5/10 = 1/2$, and the ratio in the horizontal direction becomes $8/10 = 4/5$, and applied to the AR marker 200. Therefore, a size of the second image is changed in the vertical direction with $1/2$, and in the horizontal direction with $4/5$, and then displayed on the terminal device 40.

Further, FIG. 7D illustrates an AR marker undetectable image 300d that does not include the entire of the AR marker 200 in the capturing range of the camera. Since information included in the AR marker 200 cannot be recognized in a case of FIG. 7D, it is determined that the AR marker 200 does not exists ("none"), and thereby the image of the AR marker 200 cannot be superimposed on the image. In this case, the display 46 can display a message such as "set AR marker within the capturing range of the camera" on the display 46 of the terminal device 40. With employing this configuration, a user that sees the message requesting to set the marker image within the capturing range can recognize that the angle of view of the camera should be moved so that the marker image can be set within the capturing range.

Figure 8A:
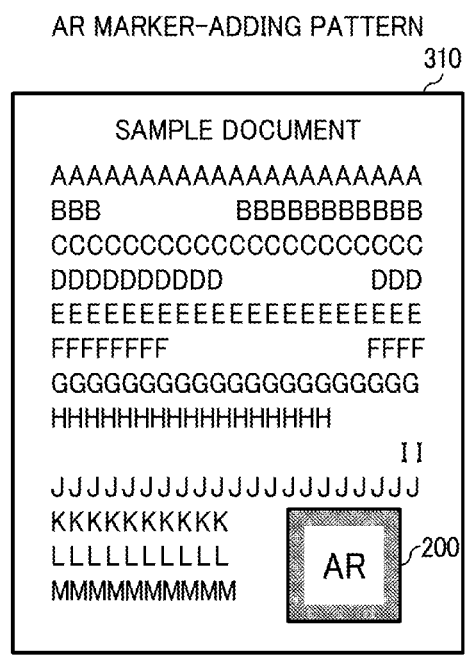
FIGS. 8A and 8B illustrate examples of AR marker image included in a print data of the first example embodiment.
Figure 8B:
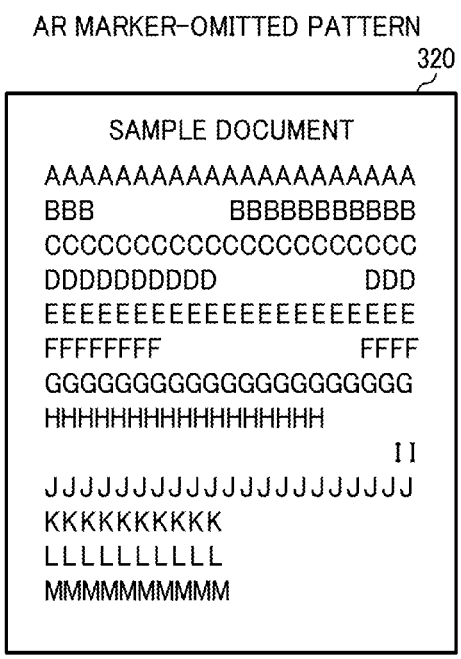

A description is given of the AR marker image included in the print data with reference to FIGS. 8A and 8B. FIGS. 8A and 8B illustrate examples of the AR marker image included in the print data of the first example embodiment. A user can designate an AR marker-adding pattern or AR marker-omitted pattern to the host PC 10. FIG. 8A illustrates an AR marker-adding pattern 310, in which the AR marker 200 is placed in the print data explicitly, and the AR marker can be placed when the following condition is met.

Size of AR marker (vertical×horizontal length)<Size of image vacant region (vertical×horizontal size length).

A description is given of two methods to place the AR marker 200 in the print data. As to a first method, an image-vacant region that matches the size of the AR marker 200 (vertical×horizontal length) is searched in the print data, and the AR marker 200 is placed in the image-vacant region. Specifically, the image-vacant region that is greater than a size of the designated AR marker 200 defined by the vertical×horizontal length is searched, and the designated AR marker 200 is placed in the image-vacant region. If the size of the AR marker is greater than the size of image vacant region, the size of the AR marker 200 is reduced and then placed in the image vacant region. As to a second method, the AR marker 200 that matches a pre-set image-vacant region is searched, and then the AR marker 200 is placed in the print data. Specifically, the AR marker 200 having a size smaller than a size of the designated image-vacant region defined by the vertical×horizontal length is searched, and the AR marker 200 matched to the placement condition (i.e., pre-set image-vacant region) is placed in the print data. If the size of the AR marker is greater than the size of image vacant region, the size of the AR marker 200 is reduced and then placed in the image-vacant region.

Further, when the plurality of the AR markers 200 can be designated or when the AR marker 200 is not designated, a term can be extracted from the contents of the print data by performing the optical character reading (OCR) processing, and then the AR marker 200 related to the term can be set. For example, the AR marker 200 having the most frequently searched term in the OCR processing is selected. FIG. 8B illustrates an AR marker-omitted pattern 320, in which image contents of the print data and the image placement pattern can be used as an AR marker similar to the AR marker 200.

(AR Marker Image)

A description is given of the AR marker image with reference to FIG. 9. FIG. 9 is an example of a classification table storing corresponding terms, classification of the corresponding terms, and AR marker images of the corresponding terms of the first example embodiment. As illustrated in FIG. 9, the AR marker images can be selected by the host PC 10 based on the corresponding terms and the classification.

(Image Displayed on Terminal Device)

Figure 10A:
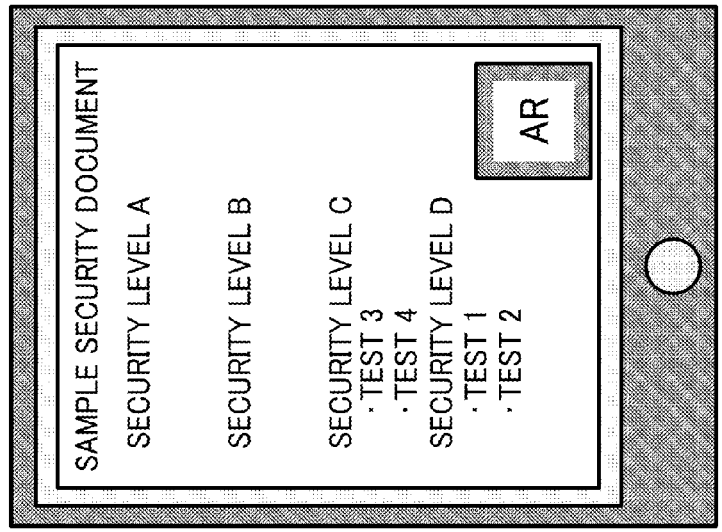
FIG. 10A illustrates a document image printed by an image forming apparatus.
Figure 10B:
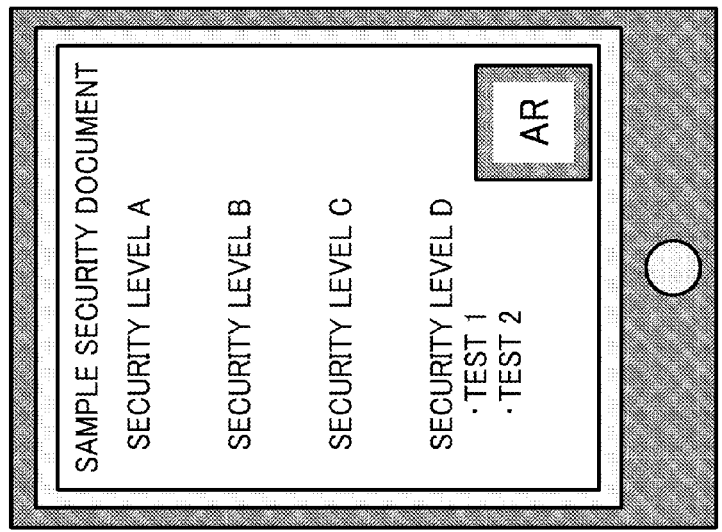
FIGS. 10B to 10E illustrate examples of images displayed on a display of the terminal device by adding information associated with a security level on a document image when the document image is being captured by the terminal device.
Figure 10C:
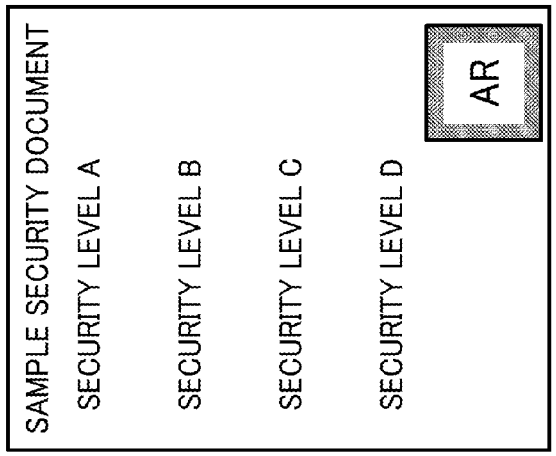
Figure 10D:
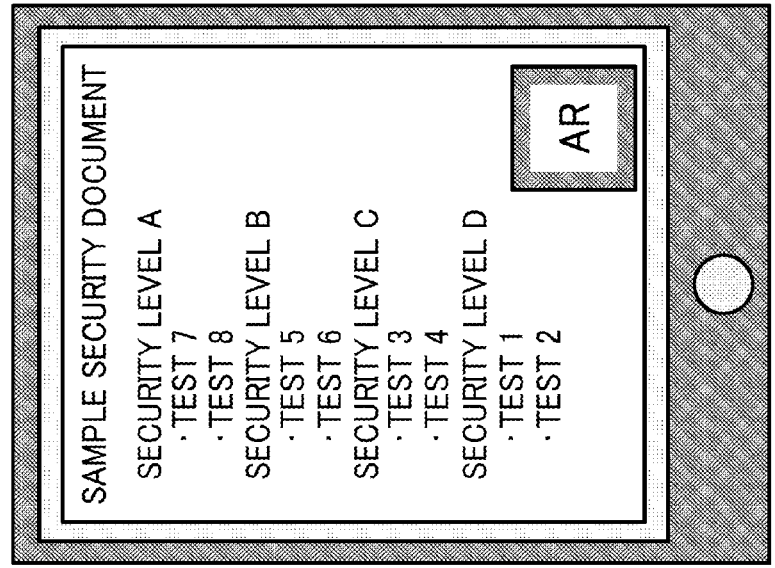
Figure 10E:
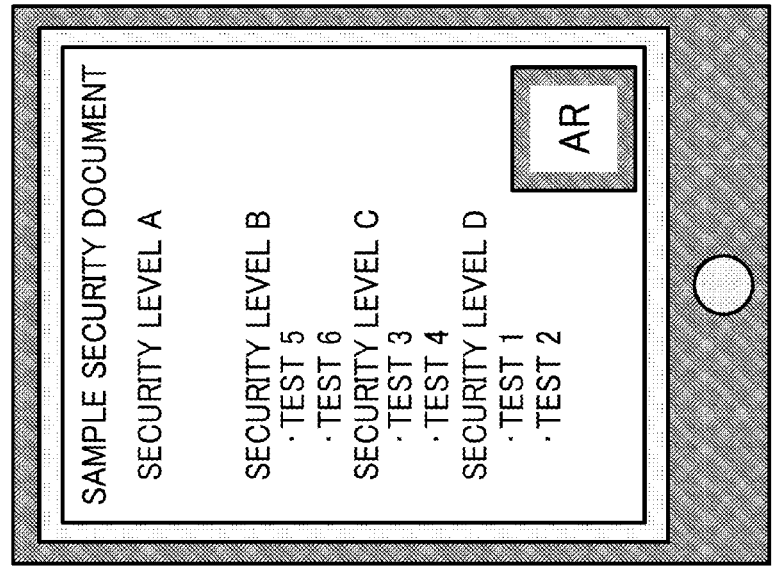

A description is given of an image displayed on the terminal device 40 with reference to FIGS. 10A to 10E. FIGS. 10B to 10E illustrate example of images displayed on the display 46 of the terminal device 40 of the first example embodiment. FIG. 10A illustrates a document image printed by the image forming apparatus 20. FIGS. 10B to 10E illustrate examples of images displayed on the display 46 of the terminal device 40 by adding information associated with the security level on the document image when the document image (see FIG. 10A) formed on the recording medium is being captured by the camera of the terminal device 40. As indicated in FIGS. 10B to 10E, data acquired from the server 30 can be switched depending on the security levels A to D.

(Operation of Host PC)

Figure 11:
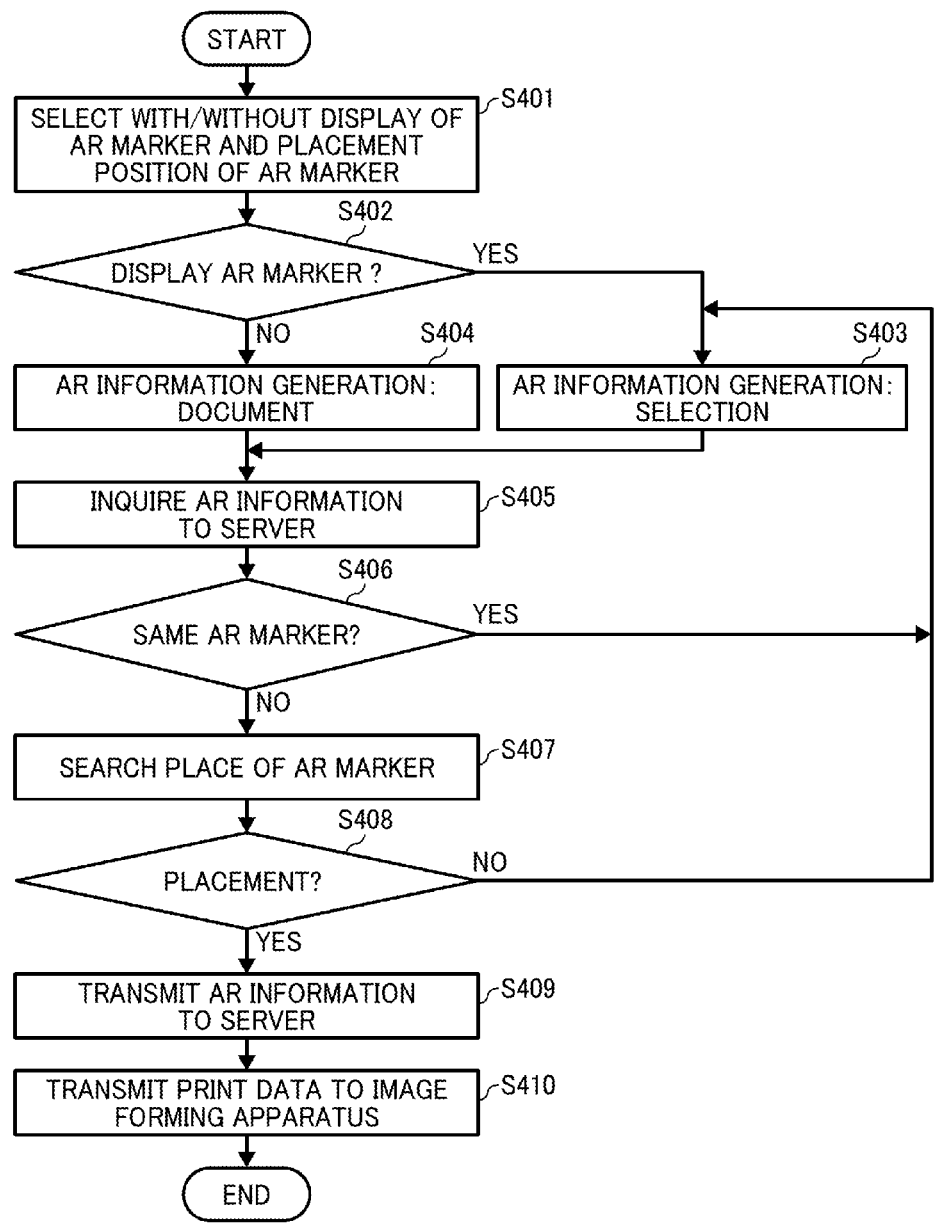
FIG. 11 is a flow chart illustrating the steps of a process of a host PC of the first example embodiment.

A description is given of an operation of the host PC 10 with reference to FIG. 11. FIG. 11 is a flow chart illustrating the steps of a process of the host PC 10 of the first example embodiment. At step S401, the AR information generator 14 selects whether AR marker is formed on the document (i.e., with or without displaying an AR marker on the recording medium) and a placement position of the AR marker on the recording medium. Specifically, the AR information generator 14 inputs a display type of AR marker 200, a placement position of the AR marker, and displayable information set for each of security levels, which are input by a user operation.

(AR Information Generation Screen at Host PC)

A description is given of an AR information generation screen displayable on the display 10e of the host PC 10 with reference to FIG. 12. FIG. 12 illustrates an example of an AR information generation screen 400 displayable on the display 10e of the host PC 10 of the first example embodiment. As illustrated in FIG. 12, the AR information generation screen 400 displayed on the host PC 10 displays the captured original image 300a, a setting section of a "marker selection," and a setting section of a "non-display information for each security level".

As to the "marker selection," "with display" means that the AR marker 200 is formed visually in the document so that a user can check the AR marker 200 visually, and "without display" means that the AR marker 200 is not formed visually in the document so that a user cannot check the AR marker 200 visually.

As to the "maker placement," the placement coordinates, the vertical×horizontal length, and automatic size reduction can be designated.

As to the "non-display information for each security level," the coordinates, the vertical×horizontal length, and the rotation angle of data prepared for each of the security levels A to D can be designated.

When an AR marker adding button 410 is pressed, the AR marker 200 is displayed on an output image. When an OK button 420 is pressed, the settings can be saved.

At step S402, the AR information generator 14 checks the "with display" and "without display" of the AR marker 200 indicated in FIG. 12. When the AR marker 200 is set with the "with display" (S402: YES), at step S403, the AR information generator 14 transmits a request of AR marker list to the server 30 via the fourth communication unit 42 to inquire an AR marker list. When the AR information generator 14 receives an AR marker list from the server 30 via the fourth communication unit 42, the AR information generator 14 displays the AR marker list on the display 10e of the host PC 10 so that a user can select the AR marker from the AR marker list. The AR information generator 14 generates AR information based on a selection result of the AR marker by the user. The user can select the AR marker from a plurality of AR markers. By contrast, if the AR marker 200 is set with the "without display" (S402: NO), at step S404, the AR information generator 14 generates AR information by processing the document itself as the AR marker 200.

(AR Marker Image Selection Screen at Host PC)

Figure 13:
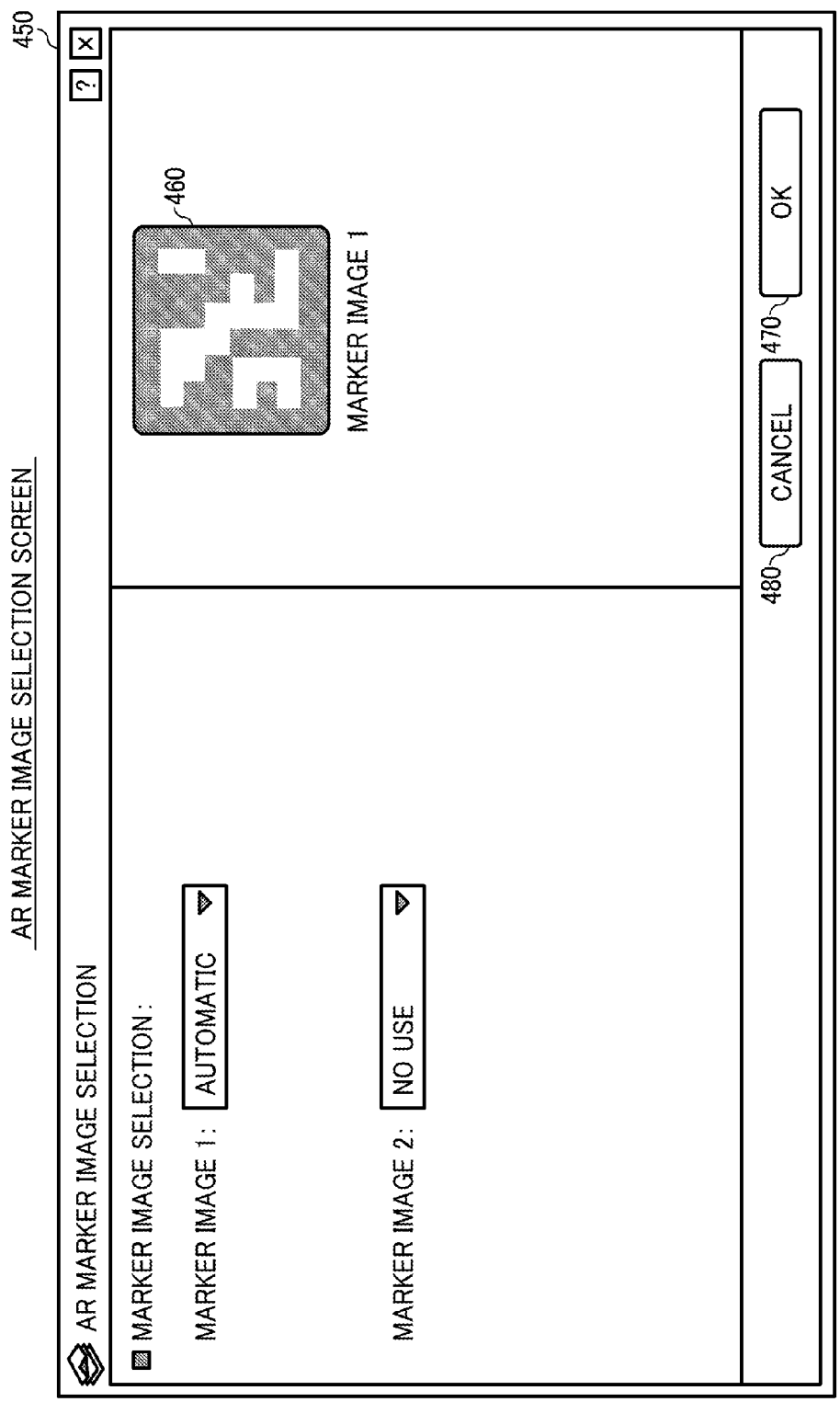
FIG. 13 illustrates an example of an AR marker image selection screen displayable on the display of the host PC of the first example embodiment.

A description is given of an AR marker image selection screen displayed at the host PC 10 with reference to FIG. 13. FIG. 13 illustrates an example of an AR marker image selection screen 450 displayable on the display 10e of the host PC 10 of the first example embodiment. As to the "marker image selection" in the setting section, "automatic" means that the AR information generator 14 automatically generates the AR marker. For example, an AR marker image 460 is automatically generated by the AR information generator 14 and displayed on a right portion of the AR marker image selection screen 450 on the display 10e of the host PC 10 as indicated in FIG. 13. When an OK button 470 is pressed, the settings can be saved.

At step S405, the first communication unit 16 transmits an inquiry request of the AR information to the server 30 via the network N, and then the first communication unit 16 receives a response of AR information from the server 30.

At step 406, the AR information generator 14 checks whether the AR marker 200 designated by the user is being currently used. When the designated AR marker 200 is being currently used (S406: Yes), the AR information generator 14 displays a warning message on the display 10e of the host PC 10. When a cancel button is pressed by the user operation, the sequence returns to step S401, and requests the user to input information of the AR marker 200 again. With employing this configuration, the message to request the inputting of the AR marker 200 again is displayed on the display 10e of the host PC 10, with which a user that sees the message can recognize that information of the AR marker 200 is required to input again. At step S406, the AR information generator 14 checks whether the user is to set one AR marker, which is being currently used, as a new AR marker so that the user can recognize that the user is to reset the same AR marker.

(Marker-Being-Used Warning Message at Host PC)

Figure 14A:
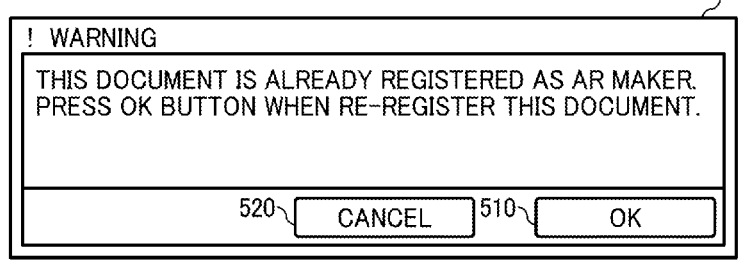
FIG. 14A illustrates an example of an marker-being-used warning message displayed on the display of the host PC when the AR marker is not formed and displayed on the recording medium.
Figure 14B:
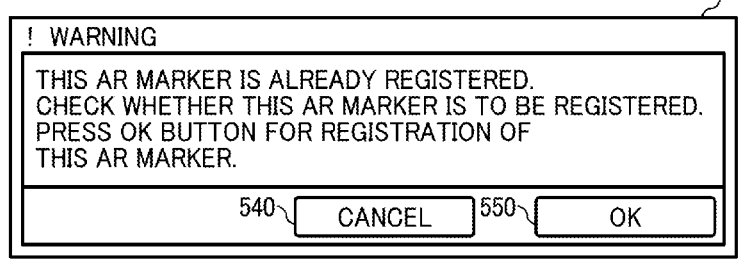
FIG. 14B illustrates an example of an marker-being-used warning message displayed on the display of the host PC when the AR marker is formed and displayed on the recording medium.
Figure 14C:
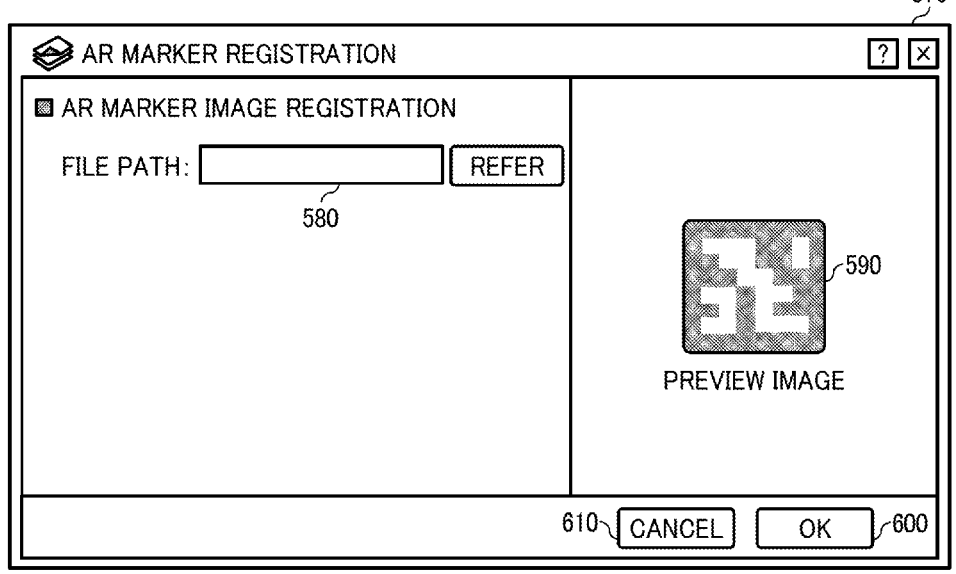
FIG. 14C illustrates an example of an AR marker registration screen displayed on the display of the host PC.

A description is given of a marker-being-used warning message displayed on the display 10e of the host PC 10 with reference to FIGS. 14A to 14C.

FIG. 14A illustrates an example of an marker-being-used warning message 500 displayed on the display 10e of the host PC 10 when the AR marker is not formed and displayed on the recording medium.

FIG. 14B illustrates an example of an marker-being-used warning message 530 displayed on the display 10e of the host PC 10 when the AR marker is formed and displayed on the recording medium.

FIG. 14C illustrates an example of an AR marker registration screen 570 displayed on the display 10e of the host PC 10.

When the AR marker 200 is to be formed on the recording medium while the same AR marker 200 is being currently used, the AR information generator 14 displays the marker-being-used warning message 530 (see FIG. 14B). When a cancel button 540 is pressed in FIG. 14B, the sequence returns to step S403, and then it is requested to input information of the AR marker 200 again.

With employing this configuration, the message to request the inputting of information of the AR marker 200 again is displayed on the display 10e of the host PC 10, with which a user that sees the message can recognize that information of the AR marker 200 is required to input again.

When the AR marker 200 is to be formed on the recording medium while the same AR marker 200 is being currently used, the AR information generator 14 returns to step S403. At step S403, when a file path is input in an input region 580 in the AR marker registration screen 570 of FIG. 14C, a preview image 590 is displayed. When a registration OK button 600 is pressed in FIG. 14C, the information of the AR marker 200 stored in the host PC 10 can be uploaded to the server 30, with which the AR marker 200 is added and stored in the server 30, and then the AR marker list in the server 30 is updated. With employing this configuration, the AR marker 200 and the list of AR marker 200 can be updated, and thereby the AR marker 200 and the list of AR marker 200 can be set as the latest data.

Further, when the designated AR marker 200 is being currently used, the AR information generator 14 can overwrite the AR information currently-set for the designated AR marker 200 with new AR information. With employing this configuration, the currently-set AR information can be overwritten by the new AR information for the AR marker 200, with which the AR marker 200 set with the latest AR information can be set and used.

At step S407, the AR information generator 14 searches the placement position of the AR marker 200 in the print data. The placement position searching is performed when the display of the AR marker 200 is displayed on the recording medium at step S401. The searching condition is set as below.

> Size of AR marker (vertical×horizontal length) selected by user<Size of placement position (vertical×horizontal length) designated by user When a plurality of AR markers is to be used, the AR information generator 14 repeats the searching of placement position for each of the AR markers selected by the user by checking whether the size of the placement position (vertical×horizontal length) designated by the user is greater than the size of the AR marker (vertical×horizontal length) selected by the user.

At step S408, the AR information generator 14 displays the warning message if all of the AR markers 200 cannot be placed in the print data.

When a cancel button is pressed by the user, the AR information generator 14 returns to step S403, and requests the user to input information of the AR marker 200 again. With employing this configuration, the message that requests a user to re-arrange a position of the AR marker 200 is displayed on the display 10e of the host PC 10, with which a user that sees the message can recognize that the placement position to be used for adding the AR marker 200 on the first image data is required to be changed.

(Re-Arrangement Message)

Figure 15:
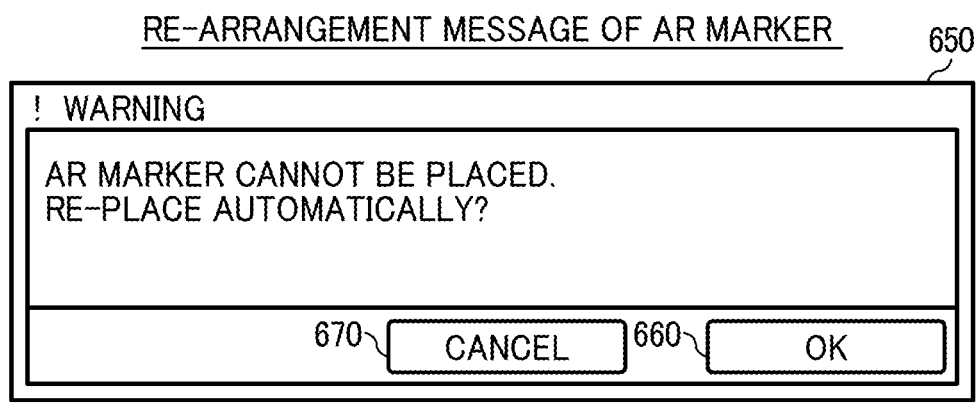
FIG. 15 illustrates an example of a re-arrangement message of AR marker displayed on the display of the host PC when a re-arrangement of AR marker is requested.

A description is given of a message requesting a re-arrangement of the AR marker 200 with reference to FIG. 15. FIG. 15 illustrates an example of a re-arrangement message 650 of AR marker displayed on the display 10e of the host PC 10 when the re-arrangement of the AR marker 200 is requested. When the placement of the AR marker 200 is not possible, the AR information generator 14 searches the image-vacant region in the document where the AR marker 200 having a given size can be fit in so that the placement position of the AR marker 200 can be determined.

With employing this configuration, even if one placement position to be used for adding the AR marker 200 on the first image data overlaps a part of the first image data, the AR marker 200 can be placed in another image-vacant region searched in the first image data.

(Re-Arrangement of AR Marker Image)

Figure 16A:
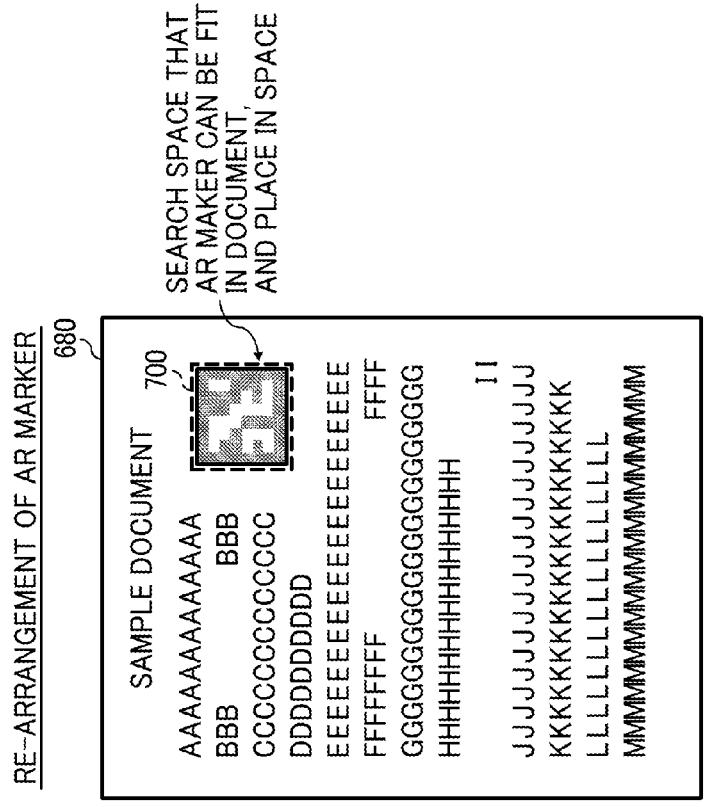
FIGS. 16A and 16B illustrate an example of re-arrangement of AR marker.
Figure 16B:
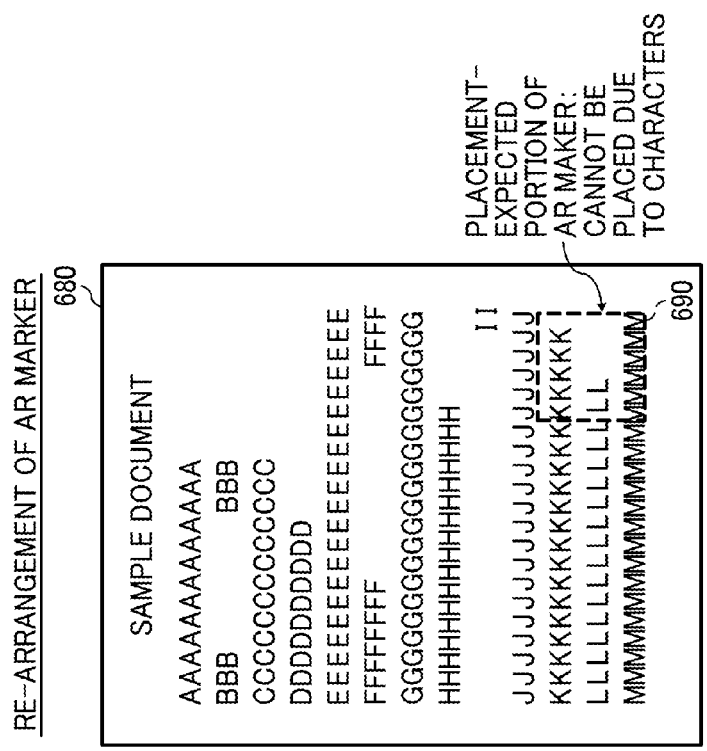

A description is given of a re-arrangement of AR marker image with reference to FIGS. 16A and 16B.

FIGS. 16A and 16B illustrate an example of re-arrangement of the AR marker image. As illustrated in FIG. 16A, as to automatic re-arrangement processing, the AR information generator 14 searches the image-vacant region, where no characters and images are placed, in a document 680 that is greater than AR marker size defined by the vertical×horizontal length, and places the AR marker if the AR marker size is smaller than the searched image-vacant region. FIG. 16A indicates a placement-expected portion 690 of the AR marker. Since characters exist in the placement-expected portion 690, the AR marker cannot be placed. By contrast, FIG. 16(b) indicates a case that the AR information generator 14 searches an image-vacant region 700 in the document 680 that is greater than the size of the AR marker size, in which the AR marker can be placed in the image-vacant region 700. If the marker size is greater than the searched image-vacant region size, the AR information generator 14 returns to step S403, and request the user to select the AR marker 200 again.

At step S409, the first communication unit 16 transmits the AR information, information correlating the AR marker 200 and print data, to-be-disclosed information for each of the security levels, and an identifier added to the original print data to the server 30 via the network N.

At step S410, the print data generator 12 generates that first image data by erasing the to-be-disclosed information set for each of the security levels from the original print data, and, transmits the first image data from the first communication unit 16 to the image forming apparatus 20 via the network N. With employing this configuration, the first image data added with the AR marker 200 is generated, and the first image data can be transmitted to the image forming apparatus 20.

(Operation of Image Forming Apparatus)

Figure 17:
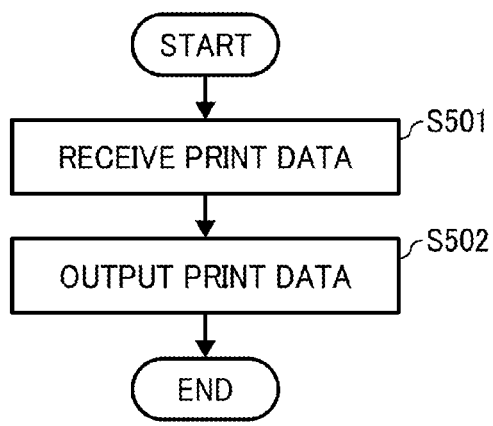
FIG. 17 is a flow chart illustrating the steps of a process of an image forming apparatus of the first example embodiment.

A description is given of an operation of the image forming apparatus 20 with reference to FIG. 17. FIG. 17 is a flow chart illustrating the steps of a process of the image forming apparatus 20 of the first example embodiment. At step S501, the second communication unit 22 receives the print data from the host PC 10 via the network N. At step S502, the print data outputting unit 24 prints the print data on a recording medium, in which the image forming apparatus 20 prints the print data on the recording medium without printing the to-be-disclosed information set for each of the security levels. With employing this configuration, the received print data (first image data) can be printed on the recording medium.

(Operation of Terminal Device)

Figure 18:
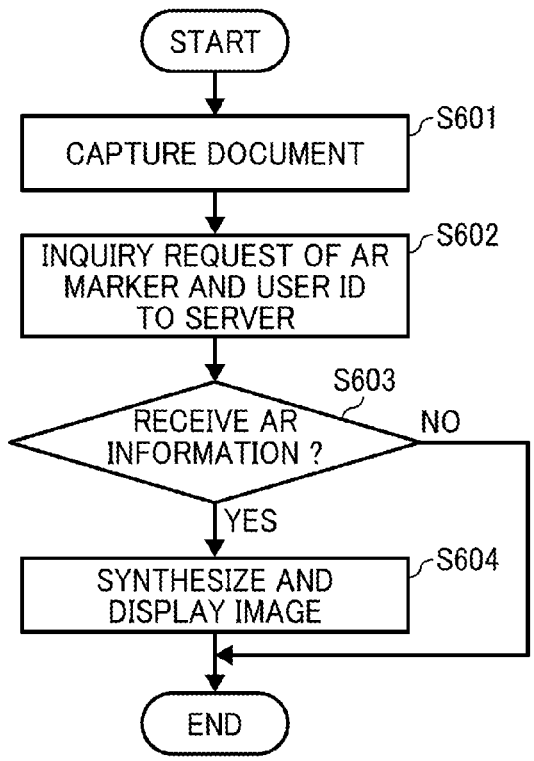
FIG. 18 is a flow chart illustrating the steps of a process of a terminal device of the first example embodiment.

A description is given of an operation of the terminal device 40 with reference to FIG. 18. FIG. 18 is a flow chart illustrating the steps of a process of the terminal device 40 of the first example embodiment.

At step S601, the image capture 50 such as a digital camera captures a document printed on a recording medium, and then the information acquisition unit 56 detects an identifier of the AR marker 200 based on the AR marker 200 captured by the image capture 50.

At step S602, the fourth communication unit 42 transmits an inquiry request of the identifier included in the detected AR marker 200, and the user ID, read out from the terminal device 40, to the server 30, in which the fourth communication unit 42 transmits the user ID and identifier to the server 30 via the network N. Further, at the terminal device 40, the user ID used for the inquiry to the server 30 can be designated by a user using the operation unit 44. With employing this configuration, the AR information associated with the designated user ID can be acquired.

Further, instead of the user ID, device IDs attached to each one of terminal devices can be used, in which the device IDs are correlated to each of users of the terminal devices as a table correlating the device IDs and users, and the table can be stored in the server 30. Therefore, when the terminal device 40 transmits the corresponding device ID to the server 30, the server 30 can identify which terminal device transmits the inquiry to the server 30, and the server 30 can transmit the AR information corresponding to the inquiry to the terminal device 40 that has transmitted the device ID. The user ID alone can be used as the identification information, the device ID alone can be used as the identification information, or the user ID and the device ID can be collectively used as the identification information in the example embodiment. When the user ID and the device ID are collectively used as the identification information, the user ID and the device ID are associated with each other, and the associated user ID and device ID can be stored in a memory.

When the fourth communication unit 42 receives the AR information from the server 30 via the network N (step S603: YES), the sequence proceeds to step S604, and the display 46 synthesizes the AR information used as the second image and the image captured at step S601, and displays the synthesized image on the display 46 of the terminal device 40. By contrast, when the AR information cannot be received from the server 30 (step S603: NO), the display 46 does not synthesizes the image.

Further, when then AR information is not received from the server 30 (S603: NO), the display 46 displays an error message. With employing this configuration, when the AR information cannot be received from the server 30, the error message is displayed on the display 46 of the terminal device 40, and thereby the user can recognize that the AR information is not received from the server 30.

(Message Displayed at Terminal Device)

Figure 19:
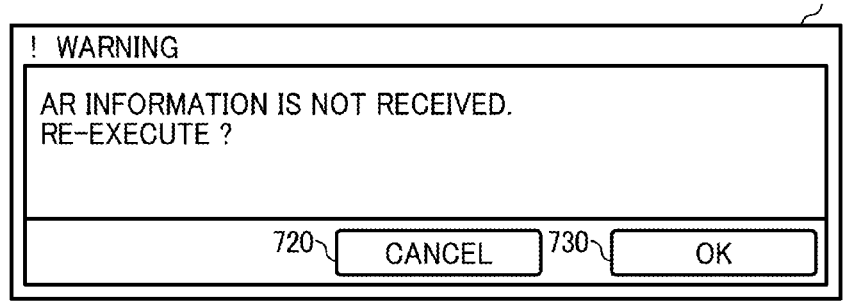
FIG. 19 illustrates an example of a message when the terminal device cannot receive AR information from a server.

A description is given of a message displayed on the display 46 of the terminal device 40 with reference to FIG. 19. FIG. 19 illustrates an example of a message 710 when the terminal device 40 cannot receive the AR information from the server 30. For example, the terminal device 40 cannot receive the AR information from the server 30 when the user ID is not registered in the server 30.

(Operation of Server)

Figure 20:
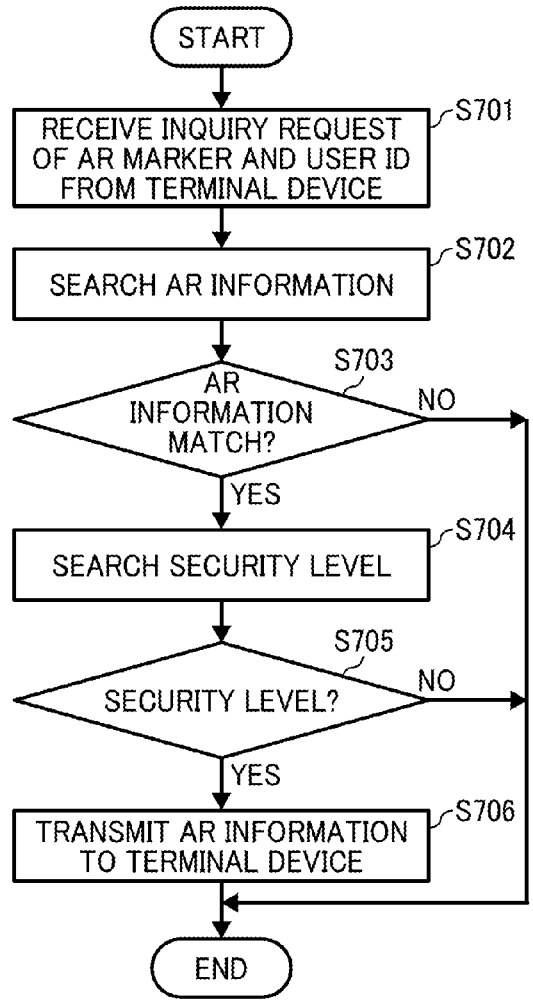
FIG. 20 is a flow chart illustrating the steps of a process of a server of the first example embodiment.

A description is given of an operation of the server 30 with reference to FIG. 20. FIG. 20 is a flow chart illustrating the steps of a process of the server 30 of the first example embodiment. At step S701, the third communication unit 34 of the server 30 receives an inquiry request of the identifier of the AR marker 200 and the user ID from the terminal device 40 via the network N. At step S702, the display data generator 32 searches AR information associated with an identifier stored in the identifier table of the AR information storage 38 using the received identifier as a search key. Table 2 is an identifier table that stores the AR information associated with the identifiers.

TABLE 2

| Identifier | AR information |
| --- | --- |
| identifier A | Information A |
| identifier B | Information B |
| identifier C | Information C |
| identifier D | Information D |
| — | |
| — | |

At step S703, the display data generator 32 of the server 30 checks whether the identifier of the AR marker 200 transmitted with the inquiry request from the terminal device 40 matches the identifier of AR information searched from the AR information storage 38. If the identifiers do not match, the sequence ends.

By contrast, if the identifiers match, the sequence proceeds to step S704. At step S704, the display data generator 32 searches a security level from a security table (Table 3) using the received user ID as a search key. Table 3 is the security table that relates the security level and the user IDs.

TABLE 3

| Security level | User ID | Remarks |
| --- | --- | --- |
| A | Taro Yamada<br>.<br>.<br>.<br>Hanako Yamamoto | Number of registration user IDs is variably set |
| B | Jiro Suzuki<br>.<br>.<br>.<br>Noriko Oikawa | Number of registration user IDs is variably set |
| C | Saburo Satou<br>.<br>.<br>.<br>Satoko Matsumoto | Number of registration user IDs is variably set |

TABLE 3-continued

| Security level | User ID | Remarks |
|---|---|---|
| D | Shiro Takahashi | Number of registration user IDs is variably set |
| . | . | |
| . | . | |
| . | . | |
| | Mami Hirano | |

At step S705, the display data generator 32 checks whether the security level is set. If the security level is not set (S705: NO), the display data generator 32 ends the sequence. By contrast, if the requested user ID is not stored in the security table, the display data generator 32 reports an error message that the security table does not include the requested user ID to the user, with which it can request the user to input the user ID again. With employing this configuration, a user that sees the error message can recognize that the user ID is not yet registered. With employing this configuration, based on the received identifier and the user ID, the AR information associated with the information clearance level of the user can be searched, and AR information can be transmitted to a sender of the user ID, with which the security level of information can be enhanced.

(Message Screen when Server does not have User ID)

Figure 21:
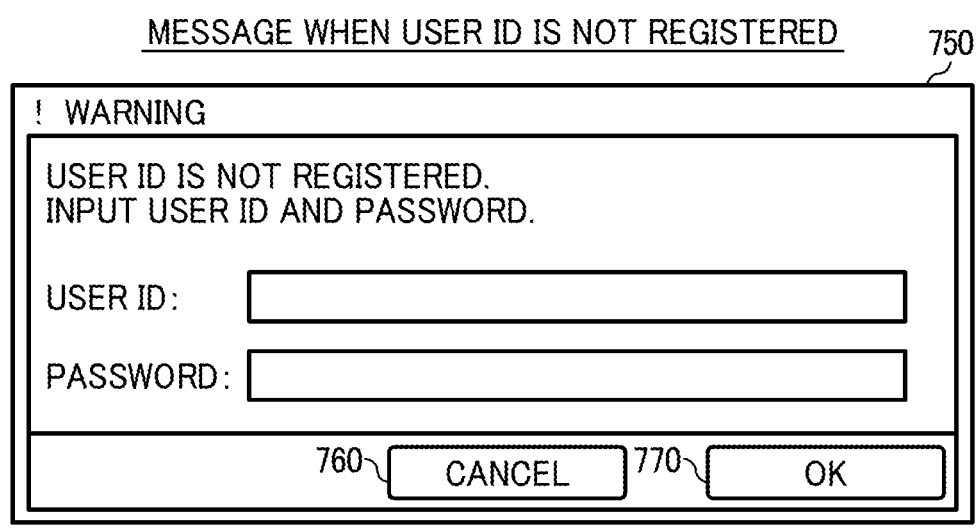
FIG. 21 illustrates an example of a message when the server does not have a user ID of the first example embodiment.

FIG. 21 illustrates an example of a message screen 750 when the server 30 does not have the user ID of the first example embodiment. When the message screen 750 is displayed, the user of the host PC 10 inputs the user ID via the interface such as the operation unit 44 as required, with which the user ID can be designated.

By contrast, when the security table has the requested user ID, at step S706, the display data generator 32 transmits the AR information to the terminal device 40 via the third communication unit 34. Further, when the server 30 receives a request of changing any one of the security level and the user ID corresponding to the security level from the host PC 10, the display data generator 32 can change any one of the security level and the user ID stored in the security table used at step S704. With employing this configuration, the security level and the user ID stored in the security table can be changed. Further, when the server 30 receives a request of changing AR information displayed for each of the security level from the host PC 10, the display data generator 32 can change AR information. With employing this configuration, the AR information can be changed as required, and usability can be enhanced.

After the display data generator 32 searches the security level (e.g., security levels A to D) of the user ID from the security table, the display data generator 32 selects and reads out an image associated with the AR information and the security level with reference to the comparison table (Table 4) correlating the AR image and the security level. The display data generator 32 transmits the selected image data to the third communication unit 34 via the terminal device 40 as the second image data. Table 4 is the comparison table that indicates a relationship of images to be transmitted to the terminal device and the corresponding AR information and security level used as information indicating the display condition.

TABLE 4

| AR information | Security level | Image to be transmitted to terminal device |
|---|---|---|
| Information A | A | image AA |
| | B | image AB |
| | C | image AC |
| | D | image AD |
| Information B | A | image BA |
| | B | image BB |
| | C | image BC |
| | D | image BD |
| . | . | . |
| . | . | . |
| . | . | . |
| Information Z | A | image ZA |
| | B | image ZB |
| | C | image ZC |
| | D | image ZD |

When the server 30 receives the inquiry of information of the AR marker from the host PC 10, the server 30 checks whether the same AR marker 200 is being currently used by referring the AR information storage 38 that stores the AR information, and transmits a check result to the host PC 10 as a response. Further, when the server 30 receives an update request of the AR marker 200 and the AR marker list stored in the original print data storage 36 of the server 30 from the host PC 10, the information in the server 30 can be updated based on the request.

In the above described example embodiment, the image capture 50 captures the image. When the image capture 50 captures the AR marker 200 (marker image) indicating a display condition of data, formed and displayed on the recording medium, the information acquisition unit 56 extracts the identifier used for identifying the AR marker 200 from the captured AR marker 200 (marker image), and the fourth communication unit 42 transmits the identifier of the AR marker 200 and the user ID used for identifying the user to the server 30.

The fourth communication unit 42 receives the second image data associated with the information clearance level of the user from the server 30. The display 46 displays the second image over the first image formed on the recording medium by superimposing the second image over the first image while the terminal device 40 is capturing the recording medium.

With employing this configuration, the second image associated with the information clearance level of user can be displayed on the display 46 of the terminal device 40 by superimposing the second image over the first image while the terminal device 40 is capturing the recording medium, and the security level can be enhanced.

Second Example Embodiment

Figure 22:
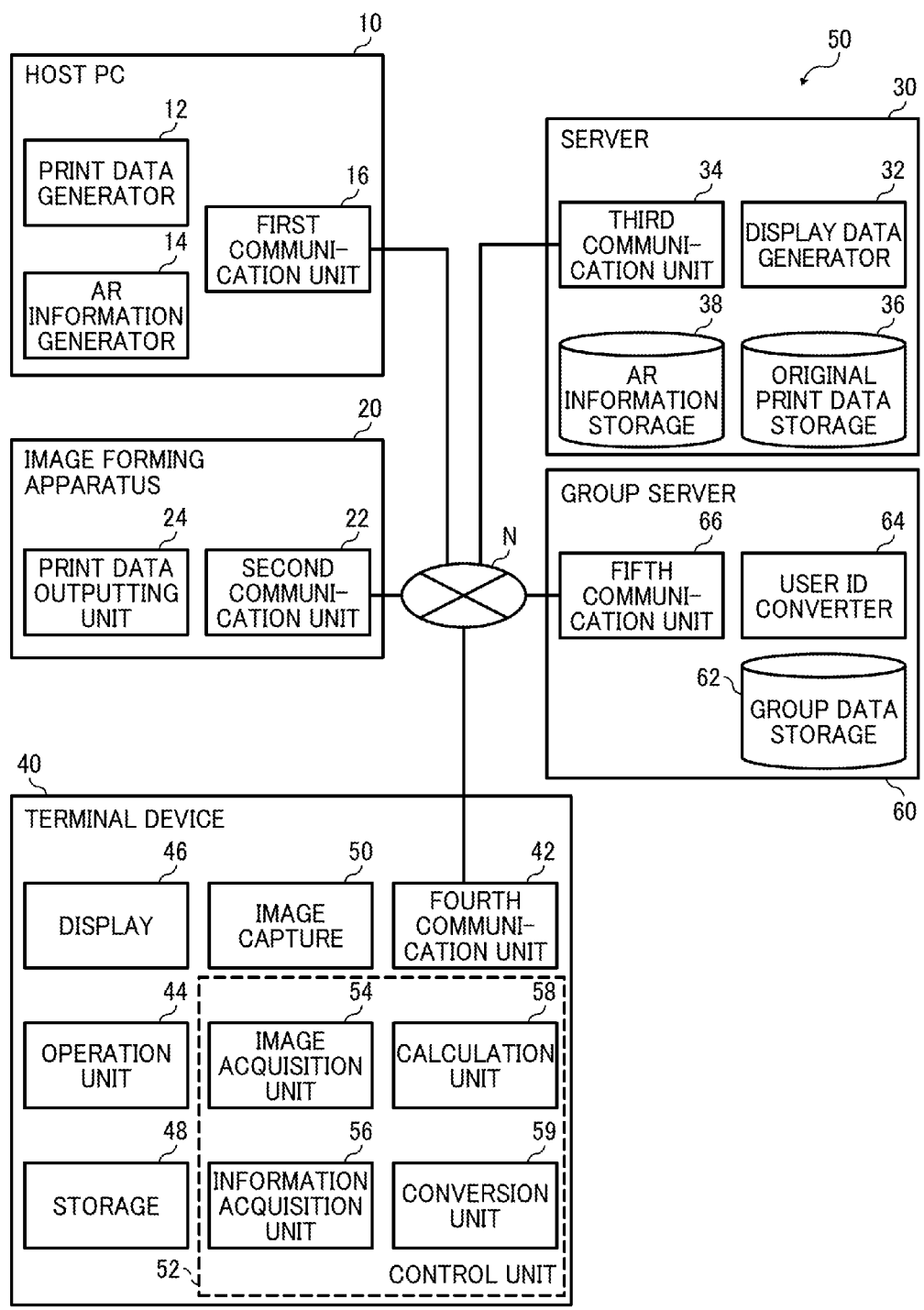
FIG. 22 is a functional block diagram of an information processing system of a second example embodiment.

A description is given of an information processing system 50 of a second example embodiment of the present invention with reference to FIG. 22. FIG. 22 is a functional block diagram of the information processing system 50 of the second example embodiment. Different from the information processing system 1 of the first example embodiment, the information processing system 50 of the second example embodiment includes a group server 60. As to the first example embodiment, the security level is determined or identified using the user ID of each person. However, information management is required for each of the persons, with which the information management may need some work load. As to the information processing system 50 of the second example embodiment, information can be managed with a unit of user group.

The group server 60 includes, for example, a group data storage 62, a user ID converter 64, and a fifth communication unit 66. The group data storage 62 stores user group information including a group table and a user group ID table. The user ID converter 64 converts the user ID to information of group that each user belongs to. The fifth communication unit 66 reports data converted by the user ID converter 64 to the terminal device 40. As to the first example embodiment, the user ID is transmitted to the server 30, and the server 30 converts the user ID to the security level related to the user ID. By contrast, as to the second example embodiment, the group server 60 that converts the user ID to the user group ID is used. The server 30 reports the user ID to the group server 60, and then the group server 60 converts the user ID to the user group ID. Then, similar to the first example embodiment, the process of acquiring AR information is performed by using the user group ID instead of the user ID. The group server 60 can employ a hardware configuration similar to the server 30.

Figure 23:
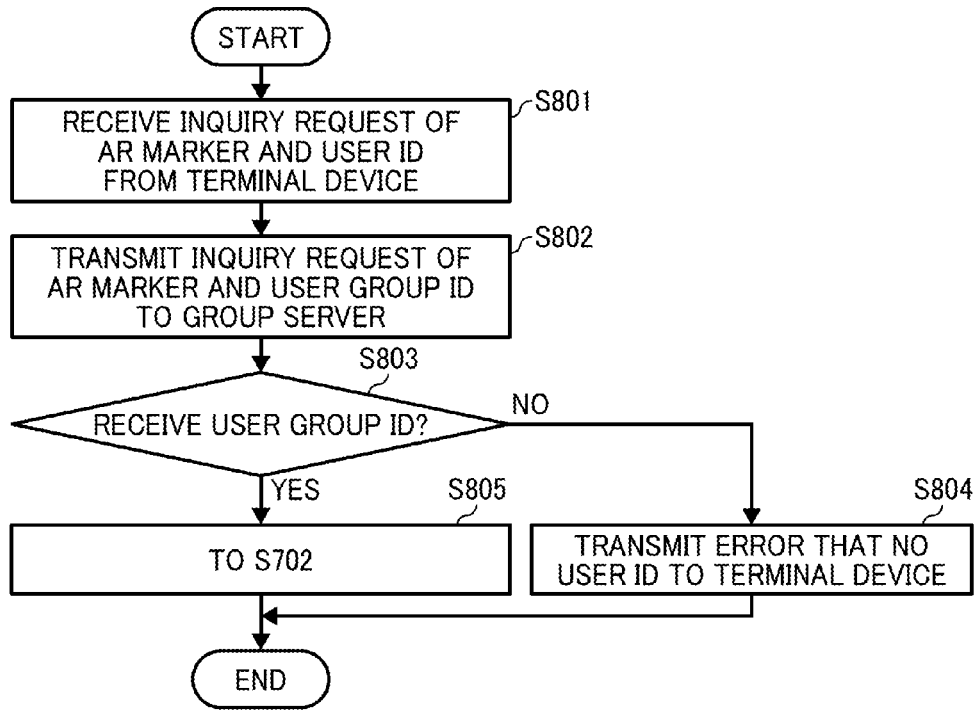
FIG. 23 is a flow chart illustrating the steps of a process of a server of the second example embodiment.

A description is given of an operation of the server 30 with reference to FIG. 23. FIG. 23 is a flow chart illustrating the steps of a process of the server 30 of the second example embodiment.

At step S801, the third communication unit 34 of the server 30 receives an inquiry request of the identifier of the AR marker 200 and the user ID from the terminal device 40 via the network N.

At step S802, the third communication unit 34 transmits an inquiry request of the identifier of the AR marker 200 and the user ID to the group server 60 to acquire the user group ID.

At step S803, if the third communication unit 34 receives the user group ID from the group server 60, the sequence proceeds to step S702 of FIG. 20, and the subsequent steps after step S702 is performed. By contrast, if the third communication unit 34 receives an error from the group server 60 (S803: NO), the sequence proceeds to step S804, and transmits an error message indicating that the user ID is not found to the terminal device 40, and the sequence ends, in which the message that the user ID is not found (see FIG. 21) is displayed on the display 46 of the terminal device 40.

Figure 24:
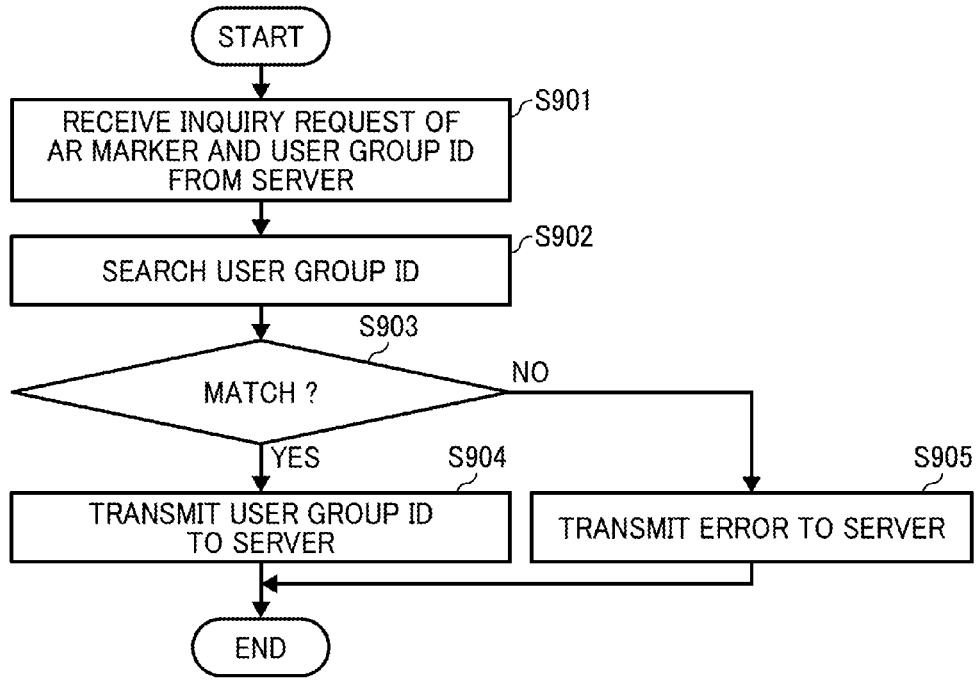
FIG. 24 is a flow chart illustrating the steps of a process of a group server of the second example embodiment.

A description is given of an operation of the group server 60 with reference to FIG. 24. FIG. 24 is a flow chart illustrating the steps of a process of the group server 60 of the second example embodiment.

At step S901, the fifth communication unit 66 of the group server 60 receives an inquiry request of the type of identifier of the AR marker, and the user group ID from the server 30.

At step S902, the user ID converter 64 of the group server 60 searches the user group ID stored in the group data storage 62 based on the received inquiry request of the type of identifier of the AR marker and the user group ID. Specifically, the user ID converter 64 searches a group table (see Table 5) using the type of the AR marker as a search key, and selects a group that matches the type of the AR marker, and then the user ID converter 64 searches the user group ID table (see Table 6) using the selected group as a search key, and selects the user group ID that matches the searched group, in which the user group ID includes a plurality of user IDs.

At step S903, the user ID converter 64 determines whether the received type of the AR marker matches the type of the AR market in the group table such as Table 5. If the received type of the AR marker does not match the type of the AR marker searched in the group table (S903: NO), at step S905, the fifth communication unit 66 transmits the error to the server 30, and ends the sequence. By contrast, if the received type of the AR marker matches the type of the AR marker searched in the group table, (S903: YES), at step S904, the fifth communication unit 66 transmits the user group ID associated with the received type of the AR marker to the server 30.

Table 5 is an example of the group table indicating a relationship between various types of AR markers (e.g., AR marker A to AR marker N) and various groups. Table 5 is stored in the group data storage 62 of the group server 60. The group table such as Table 5 stores, for example, various types of AR markers and various groups. For example, one type of the AR markers such as the AR marker A is related to "customers of rank A."

TABLE 5

| Type of AR marker | Group | Remarks |
|---|---|---|
| AR marker A | Customers of rank A | |
| AR marker B | Managers of company B | |
| AR marker C | Nation C: annual income | plurality of groups |
| | Nation C: saving amount | can be registered |
| . | . | |
| . | . | |
| AR marker N | Nation N: genders | |

As to the group searching by using the user ID converter 64, the user ID converter 64 selects a group that matches the type of AR marker with reference to the group table (Table 5) that relates the groups and the types of AR marker. The group table can be registered in the group server 60.

Further, Table 6 is an example of the user group ID table that indicates a relationship of the customers of rank A and a plurality of user IDs. The plurality of user IDs related to the "customers of rank A" can be stored in the group data storage 62 of the group server 60 as Table 6. For example, the user group ID table stores the user IDs of "Taro Yamada" to "Hanako Yamamoto" related to "platinum members" of the "customers of rank A."

TABLE 6

| Customers of rank A | User ID | Remarks |
|---|---|---|
| Platinum member | Taro Yamada | Number of registration user IDs is variably set |
| | . | |
| | . | |
| | Hanako Yamamoto | |
| Gold member | Jiro Suzuki | Number of registration user IDs is variably set |
| | . | |
| | . | |
| | Noriko Oikawa | |
| Silver member | Saburo Satou | Number of registration user IDs is variably set |
| | . | |
| | . | |
| | Satoko Matsumoto | |
| Regular member | Shiro Takahashi | Number of registration user IDs is variably set |
| | . | |
| | . | |
| | Mami Hirano | |

The user ID converter 64 searches the user group ID with reference to the user group ID table (Table 6) set for the selected group, in which the user group ID associated with the customers of rank A is selected.

As to the second example embodiment, when the server 30 receives an inquiry request of the type of the identifier of the AR marker 200 and the user ID from the terminal device 40 via the network N, the server 30 transmits the inquiry request of the type of the identifier of the AR marker 200 and the user group ID to the group server 60. The group server 60 searches the user group ID stored in the group data storage 62 based on the inquiry request of the type of the identifier of the AR marker 200 and the user group ID received from the server 30, and then the group server 60 transmits the user group ID associated with the type of AR marker to the server 30.

With employing this configuration, the server 30 can receive the user group ID related to the identifier of the AR marker 200 from the group server 60, and the server 30 can search the AR information associated with the information clearance level of one user group based on the received user group ID, and then the server 30 can transmit the AR information to a sender of the user ID, with which the security level of information can be enhanced.

Further, based on the user group ID associated with the identifier of the AR marker, data to be displayed at the terminal device can be changed. Further, a user group table suitable for the identifier of the AR marker can be selected from a plurality of user group tables. Further, if the user group table stores a plurality of group information in advance, the group information can be used for various groups. Further, if the group information cannot be acquired, the warning message can be displayed at the terminal device.

The above described example embodiment have following configurations.

(Configuration 1)

As to the information processing system 1 of configuration 1, the information processing system 1 includes the server 30, and the terminal device 40 communicable with the server 30 via the network N. The terminal device 40 includes the display 46, the image capture 50, and the circuitry (e.g., CPU 40*a*). The image capture 50 captures a marker image and a first image formed on the recording medium, the marker image indicating a condition of displaying information on the display 46. The circuitry extracts an identifier of the marker image from the marker image captured by the image capture, transmits the extracted identifier of the captured marker image and at least one of identification information for identifying the terminal device and identification information for identifying a user of the terminal device to the server, receives data of a second image associated with the identifier of the marker image and at least one of the identification information of the terminal device and the identification information of the user of the terminal device from the server, the data of second image variably set depending on at least one of an information clearance level of the terminal device and an information clearance level of the user of the terminal device, and superimposes the second image over the first image on the display to view the second image and the first image collectively on the display while the recording medium is being captured by the image capture.

As to the information processing system 1 of configuration 1, The image capture 50 captures a marker image (e.g., AR marker 200) and the first image formed on the recording medium, in which the marker image indicates a condition of displaying information on the display. The information acquisition unit 56 extracts an identifier of the marker image (e.g., AR marker 200) from the marker image captured by the image capture 50. The fourth communication unit 42 transmits the extracted identifier of the captured marker image and and at least one of identification information for identifying the terminal device 40 and identification information for identifying a user of the terminal device 40 to the server 30. The fourth communication unit 42 receives data of the second image associated with the identifier of the marker image (e.g., AR marker 200) and at least one of the identification information of the terminal device 40 and the identification information for identifying the user of the terminal device 40 from the server 30, in which the data of second image is variably set depending on an information clearance level of the terminal device 40. The display 46 superimposes the second image over the first image on the display 46 to view the second image and the first image collectively on the display 46 while the recording medium is being captured by the image capture 50. With employing this configuration, the second image data associated with the information clearance level of at least one of the identification information of the terminal device 40 and the user can be displayed while being superimposed over the first image when the image capture is capturing the recording medium, with which the security level of information can be enhanced.

(Configuration 2)

As to the information processing system 1 of configuration 2, the server 30 includes a memory (e.g., HDD 30*e*) to store the data of second image associated with the identifier of the marker image and the identification information of the terminal device, and the circuitry (e.g., CPU 30*a*).

The circuitry receives at least one of the identification information of the terminal device and the identification information of the user of the terminal device from the terminal device, searches the data of second image that matches at least one of the information clearance level of the terminal device and the information clearance level of the user of the terminal device in the memory based on the identifier of the marker image and at least one of the identification information of the terminal device and the identification information of the user of the terminal device received from the terminal device, and transmits the data of second image to the terminal device that has transmitted the identification information to the server. As to the information processing system 1 of configuration 2, the server 30 includes the AR information storage 38 that stores the second image data (e.g., AR information) associated with the identifier of the marker image and at least one of the identification information of the terminal device 40 (e.g., device ID) and the identification information of the user of the terminal device 40 (e.g., user ID), the third communication unit 34 that receives the identifier of the marker image and at least one of the identification information of the terminal device 40 (e.g., device ID) and the identification information of the user of the terminal device 40 (e.g., user ID) from the terminal device 40, the display data generator 32 that searches the AR information associated with at least one of the information clearance level of the terminal device 40 and the information clearance level of the user of the terminal device 40 in the AR information storage 38 based on the identifier of the marker image and at least one of the identification information of the terminal device 40 (e.g., device ID) and the identification information of the user of the terminal device 40 (e.g., user ID), and the third communication unit 34 transmits the AR information to the sender of the user ID. With employing this configuration, the AR information associated with at least one of the information clearance level of the of the terminal device 40 and the information clearance level of the user of the terminal device 40 can be searched based on the received identifier of the marker image and any one of the identification information of the terminal device (e.g., device ID) and the identification information of the user of the terminal device (e.g., user ID), and the AR information can be transmitted to the sender of the user ID, with which the security level of information can be enhanced.

(Configuration 3)

As to the information processing system 1 of configuration 3, the information processing system 1 further includes the information processing apparatus (e.g., host PC 10), and the image forming apparatus 20. The information processing apparatus generates data of the first image added with the marker image (e.g., AR marker 200), and transmits the data of the first image added with the marker image to the image forming apparatus. As to the information processing system 1 of configuration 3, the host PC 10 includes the print data generator 12 that generates the data of first image added with the AR marker 200, and the first communication unit 16 that transmits the data of first image to the image forming apparatus 20. With employing this configuration, the data of first image added with the AR marker 200 can be generated, and the first image data added with the AR marker 200 can be transmitted to the image forming apparatus 20.

(Configuration 4)

As to the information processing system 1 of configuration 4, the image forming apparatus 20 receives the data of first image added with the marker image, and prints the first image and the marker image on the recording medium. As to the information processing system 1 of configuration 4, the image forming apparatus 20 includes the second communication unit 22 that receives the print data such as the data of first image from the host PC 10, and the print data outputting unit 24 that prints the print data on the recording medium. With employing this configuration, when the image forming apparatus 20 receives the print data, the received print data can be printed on the recording medium.

(Configuration 5)

As to the information processing system 1 of configuration 5, the information processing apparatus includes the display 10e. When the marker image (e.g., AR marker 200) is being currently used when the circuitry of the information processing apparatus is to generate the data of first image added with the marker image, the display 10e of the information processing apparatus displays a warning message indicating that the marker image is being currently used. As to the information processing system 1 of configuration 5, when the marker image (e.g., AR marker 200) is being currently used when the AR information generator 14 of the host PC 10 is to generate the data of first image added with the marker image (e.g., AR marker 200), the message to request the inputting of information of the AR marker 200 again is displayed on the display 10e of the host PC 10, with which a user that sees the message can recognize that information of the AR marker 200 is required to input again.

(Configuration 6)

As to the information processing system 1 of configuration 6, the information processing apparatus includes the interface (e.g., AR marker registration screen 570). When the data of first image added with the marker image is to be generated, the interface is used to update the marker image. As to the information processing system 1 of configuration 6, when the AR information generator 14 of the host PC 10 generates the first image data added with the marker image (e.g., AR marker 200), the AR information generator 14 can update the AR marker 200 and the list of AR marker 200 base on an user operation to the AR marker registration screen 570. With employing this configuration, the AR marker 200 and the list of AR marker 200 can be updated by using the AR marker registration screen 570, and thereby the AR marker 200 and the list of AR marker 200 can be updated to the latest data.

(Configuration 7)

As to the information processing system 1 of configuration 7, when the marker image (e.g., AR marker 200) is being currently used when the circuitry of the information processing apparatus overwrites information currently set for the marker image with new information.

As to the information processing system 1 of configuration 7, when the marker image (e.g., AR marker 200) is being currently used when the AR information generator 14 of the host PC 10 is to generate the data of first image added with the AR marker 200, the AR information generator 14 can overwrite the AR information of the designated AR marker 200 with new AR information. With employing this configuration, the AR marker 200 set with new information can be overwritten on the currently used AR marker 200 set with the currently-used information, with which the AR marker 200 set with the latest information can be generated and used.

(Configuration 8)

As to the information processing system 1 of configuration 8, the information processing apparatus includes the display 10e. When the circuitry of the information processing apparatus is to generate the data of first image added with the marker image (e.g., AR marker 200), and a placement position of the marker image on the data of first image overlaps a part of the first image, the display 10e of the information processing apparatus displays a warning message indicating that a re-arrangement of the marker image is required. As to the information processing system 1 of configuration 8, when the AR information generator 14 of the host PC 10 generates the first image data added with the AR marker 200 (marker image), and the placement position of the AR marker 200 on the data of first image overlaps a part of the first image, the display 10e of the information processing apparatus displays a warning message indicating that a re-arrangement of the AR marker 200 is required. With employing this configuration, the message that requests a user to re-arrange a position of the AR marker 200 is displayed on the display 10e of the host PC 10, with which a user that sees the message can recognize that the placement position to be used for adding the AR marker 200 on the first image is required to be changed.

(Configuration 9)

As to the information processing system 1 of configuration 9, when the circuitry of the information processing apparatus is to generate the data of first image added with the marker image (e.g., AR marker 200), and a placement position of the marker image on the data of first image overlaps a part of the first image, the circuitry of the information processing apparatus searches an image-vacant region on the data of the first image, and places the marker image within the image-vacant region. As to the information processing system 1 of configuration 10, when the AR information generator 14 of the host PC 10 generates the first image data added with the AR marker 200 (marker image), and a placement position of the AR marker 200t overlaps a part of the first image, the image-vacant region is searched on the data of first image, and the AR marker 200 is placed within the image-vacant region. With employing this configuration, even if one placement position to be used for adding the AR marker 200 on the data of first image overlaps a part of the first image, the AR marker 200 can be placed in another image-vacant region searched in the data of first image.

(Configuration 10)

As to the information processing system 1 of configuration 10, the display 46 of the terminal device 40 displays an error message when the terminal device 40 does not receive the data of the second image such as the AR information from the server 30. As to the information processing system 1 of configuration 10, the display 46 of the terminal device 40 displays the error message when the terminal device 40 cannot acquire the AR information from the server 30. With employing this configuration, when the AR information cannot be received from the server 30, the error message is displayed on the display 46 of the terminal device 40, and thereby the user can recognize that the AR information is not received from the server 30.

(Configuration 11)

As to the information processing system 1 of configuration 11, the terminal device 401 includes the interface such as the operation unit 44 used for designating at least one of the identification information of the terminal device 40 (e.g., device ID) and the identification information of the user of the terminal device 40 (i.e., user ID) when the terminal device 40 is to acquire the data of the second image such as the AR information from the server 30. As to the information processing system 1 of configuration 11, the operation unit 44 of the terminal device 40 can be used to designate the user ID when the terminal device 40 is to acquire the AR information from the server 30. With employing this configuration, the AR information associated with the designated user ID can be acquired.

(Configuration 12)

As to the information processing system 1 of configuration 12, the memory of the server 30 stores a security table correlating the information clearance level and the identification information of the terminal device with each other, and the circuitry of the server changes the information clearance level and the identification information of the terminal device stored in the security table when the server receives a request of changing any one of the information clearance level and the identification information of the terminal device stored in the security table. Further, the memory of the server 20 stores a security table associating the information clearance level and the identification information of the user of the terminal device with each other, and the circuitry of the server changes at least one of the information clearance level and the identification information of the user of the terminal device stored in the security table when the server receives a request for changing the at least one of the information clearance level and the identification information of the user of the terminal device stored in the security table. As to the information processing system 1 of configuration 12, the display data generator 32 of the server 30 can be used to change the information clearance level and the identification information of the terminal device stored in the security table when the server 30 receives a request of changing any one of the information clearance level and the identification information of the terminal device or any one of the information clearance level and the identification information of the user of the terminal device stored in the security table. With employing this configuration, the user ID stored in the security table can be changed as required.

(Configuration 13)

As to the information processing system 1 of configuration 13, the circuitry of the server 30 changes the data of the second image such as the AR information. As to the information processing system 1 of configuration 13, the display data generator 32 of the server 30 can be used to change the AR information. With employing this configuration, the AR information can be changed as required, with which usability can be enhanced.

(Configuration 14)

As to the information processing system 1 of configuration 14, the circuitry of the terminal device switches a number of repeating times of a process that extracts the identifier of the marker image from the marker image, transmits the extracted identifier of the captured marker image and at least one of the identification information of the terminal device and the identification information of the user of the terminal device to the server, receives the data of the second image associated with the identifier of the marker image and at least one of the identification information of the terminal device and the identification information of the user of the terminal device from the server, and superimposes the second image such as the AR information over the first image on the display based on computing capability of the circuitry of the terminal device. As to the information processing system 1 of configuration 14, the control unit 52 of the terminal device 40 can switch a number of repeating times of a process that extracts the identifier of the marker image from the marker image, transmits the extracted identifier of the captured marker image and at least one of the identification information of the terminal device and the identification information of the user of the terminal device to the server, receives the data of the second image associated with the identifier of the marker image and at least one of the identification information of the terminal device and the identification information of the user of the terminal device from the server, and superimposes the second image such as the AR information over the first image on the display based on the computing capability of the CPU. With employing this configuration, the number of repeating times of a process that extracts the identifier of the marker image from the marker image, transmits and the extracted identifier of the captured marker image and at least one of the identification information for identifying the terminal device and the identification information for identifying the user of the terminal device to the server, receives the data of the second image associated with the identifier of the marker image and at least one of the identification information of the terminal device and the identification information of the user of the terminal device from the server, and superimposes the second image such as the AR information over the first image can be switched based on the computing capability of the CPU.

(Configuration 15)

As to the information processing system 1 of configuration 15, the circuitry of the terminal device 40 switches the number of repeating times of the process based on a designation of the number of repeating times of the process. As to the information processing system 1 of configuration 17, the control unit 52 of the terminal device 40 can switches the number of repeating times of the process based on the designation of the number of repeating times of the process, which may be designated by the user. With employing this configuration, the number of repeating times of the process can be switched based on the number of repeating times of the process designated by the user.

(Configuration 16)

As to the information processing system 1 of configuration 16, when the marker image formed on the recording medium is not within a capturing range of the image capture 50 when to capture the recording medium, the display 46 of the terminal device 40 displays a message requesting to set the marker image within the capturing range of the image capture. With employing this configuration, a user that sees the message requesting to set the marker image within the capturing range can recognize that the angle of view of the camera should be moved so that the marker image can be set within the capturing range.

(Configuration 17)

As to the terminal device 40 of configuration 17 used in the information processing system 1 including the server 30, the terminal device 40 is communicable with the server 30 via the network N. The terminal device 40 includes the display 46, the image capture 50 to capture a marker image and a first image formed on a recording medium, the marker image indicating a condition of displaying information on the display, and the circuitry. The circuitry extracts an identifier of the marker image from the marker image captured by the image capture, transmits the extracted identifier of the captured marker image and at least one of identification information for identifying the terminal device and identification information for identifying a user of the terminal device to the server, receives data of a second image associated with the identifier of the marker image and at least one of the identification information of the terminal device and the identification information of the user of the terminal device from the server, the data of second image variably set depending on at least one of an information clearance level of the terminal device and an information clearance level of the user of the terminal device, and superimposes the second image over the first image on the display to view the second image and the first image collectively on the display while the recording medium is being captured by the image capture. With employing this configuration, the second image data associated with the information clearance level of the user can be superimposingly displayed over the first image when the image capture is capturing the recording medium, with which the security level of information can be enhanced.

(Configuration 18)

As to the terminal device 40 of configuration 18, when the display 46 of the terminal device 40 superimposes the second image over the first image to view the second image and the first image collectively on the display of the terminal device, in which the second image displayed on the display is variably set depending on at least one of the information clearance level of the terminal device and the information clearance level of the user of the terminal device.

(Configuration 19)

As to the configuration 19, the method of processing data by using the terminal device 40 is devised. The terminal device 40 used in the information processing system 1 including the server 30 is communicable with the server 30 via the network N. The method includes capturing a marker image and a first image formed on a recording medium, the marker image indicating a condition of displaying information on the display 46, extracting an identifier of the marker image from the marker image captured by the capturing step, transmitting the extracted identifier of the captured marker image and at least one of identification information for identifying the terminal device and identification information for identifying a user of the terminal device to the server, receiving data of a second image associated with the identifier of the marker image and at least one of the identification information of the terminal device and the identification information of the user of the terminal device from the server, the data of second image variably set depending on at least one of an information clearance level of the terminal device and an information clearance level of the user of the terminal device, and superimposing the second image over the first image on the display 46 to view the second image and the first image collectively on the display while the recording medium is being captured. With employing this configuration, the second image data associated with any one of the information clearance level of the terminal device and the information clearance level of the user can be superimposingly displayed over the first image when the image capture is capturing the recording medium, with which the security level of information can be enhanced.

As to the above described example embodiments of the present invention, the second image data associated with the information clearance level of user can be superimposed over the first image data to display the second image and the first image on the display of the terminal device when the image capture of the terminal device is capturing the recording medium, with which the security level of information can be enhanced.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing system comprising:
a server; and
a terminal device communicably coupled to the server via
a network, the terminal device including:
a display,
an image capturing device configured to capture a recording medium including a marker image and a first image, the marker image indicating a condition of displaying information on the display, and
circuitry configured to
extract an identifier of the marker image from the marker image captured by the image capturing device, transmit, to the server, the identifier of the marker image and at least one of
first identification information for identifying the terminal device, and
second identification information for identifying a user of the terminal device,
receive a second image associated with the identifier of the marker image and the at least one of the first identification information and the second identification information from the server, the second image being variably set depending on at least one of first information clearance level of the terminal device and second information clearance level of the user of the terminal device;
superimpose the second image over the first image to cause the display to collectively display the second image and the first image while the recording medium is being captured by the image capturing device; and
set a number of times the extraction, the transmission, the reception, and the superimposition are repeated based on a computing capability of the circuitry of the terminal device.

2. The information processing system of claim 1, wherein the server includes
a memory configured to store the second image in association with the identifier of the marker image and the at least one of the first identification information and the second identification information; and
circuitry configured to
receive the identifier of the marker image and the at least one of the first identification information and second the identification information from the terminal device;
identify the second image that matches the at least one of the first information clearance level and the second information clearance level in the memory based on the identifier of the marker image and the at least one of the first identification information and the second identification information received from the terminal device; and
transmit the second image to the terminal device.

3. The information processing system of claim 1, further comprising:
an information processing apparatus; and
an image forming apparatus,
wherein the information processing apparatus includes circuitry configured to
generate the first image and the marker image, and
transmit the first image to the image forming apparatus.

4. The information processing system of claim 3, wherein the image forming apparatus includes circuitry configured to
receive the first image and the marker image, and
print the first image and the marker image on the recording medium.

5. The information processing system of claim 3, wherein the information processing apparatus further includes a display, and
wherein the circuitry of the information processing apparatus is further configured to display a warning message on the display indicating that the marker image is being currently used when the marker image is already in use.

6. The information processing system of claim 3, wherein the information processing apparatus includes further an interface, and
wherein, the circuitry of the information processing apparatus is further configured to receive an instruction to update the marker image when the first image and the marker image are to be generated.

7. The information processing system of claim 3, wherein the circuitry of the information processing apparatus is further configured to overwrite information currently set for the marker image with new information when the marker image is already in use.

8. The information processing system of claim 3, wherein the information processing apparatus further includes a display,
wherein when the circuitry of the information processing apparatus is further configured to display a warning message on the display requesting re-arrangement of the marker image when a placement position of the marker image overlaps the first image.

9. The information processing system of claim 3, wherein when the circuitry of the information processing apparatus is further configured to search for an image-vacant region, and places the marker image within the image-vacant region when a placement position of the marker image overlaps the first image.

10. The information processing system of claim 1, wherein the display of the terminal device displays an error message when the terminal device does not receive the second image from the server.

11. The information processing system of claim 1, wherein the terminal device includes an interface configured to receive at least one of the first identification information and the second identification information.

12. The information processing system of claim 2, wherein the memory of the server is further configured to store a first security table associating the first information clearance level to the first identification information, and the circuitry of the server is further configured to change at least one of the first information clearance level and the first identification information stored in the first security table when the server receives a corresponding request,
wherein the memory of the server is further configured to stores a second security table associating the second information clearance level to the second identification information, and the circuitry of the server is further configured to change at least one of the second information clearance level and the second identification information stored in the second security table when the server receives a corresponding request.

13. The information processing system of claim 2, wherein the circuitry of the server is further configured to change the second image.

14. The information processing system of claim 1, wherein the circuitry of the terminal device is further configured to set the number of times based on a corresponding designation.

15. The information processing system of claim 1, wherein the display of the terminal device is configured to display a message requesting the marker image be set within a capturing range of the image capturing device, when the marker image is not within a capturing range of the image capturing device.

16. A terminal device communicably Coupled to a server via a network, the terminal device comprising:
a display;
an image capturing device configured to capture recording medium including a marker image and a first image, the marker image indicating a condition of displaying information on the display; and circuitry configured to
- extract an identifier of the marker image from the marker image captured by the image capturing device,
- transmit, to the server, the identifier of the marker image and at least one of
  - first identification information for identifying the terminal device, and
  - second identification information for identifying a user of the terminal device to the server,
- receive a second image associated with the identifier of the marker image and the at least one of the first identification information and the second identification information from the server, the second image being variably set depending on at least one of an information clearance level of the terminal device and an information clearance level of the user of the terminal device;
- superimpose the second image over the first image to cause the display to collectively display the second image and the first image while the recording medium is being captured by the image capturing device; and
- set a number of times the extraction, the transmission, the reception, and the superimposition are repeated based on a computing capability of the circuitry of the terminal device.

17. The terminal device of claim 16, wherein the second image displayed on the display is variably set depending on at least one of the information clearance level of the terminal device and the information clearance level of the user of the terminal device.

18. The terminal device of claim 16, wherein the circuitry of the terminal device is further configured to set the number of times based on a corresponding designation.

19. A method of processing data by a terminal device communicably coupled to a server via a network, the method comprising:
- capturing a recording medium including a marker image and a first image, the marker image indicating a condition of displaying information on a display;
- extracting an identifier of the marker image from the marker image in response to the capturing;
- transmitting, to the server, the identifier of the marker image and at least one of
  - first identification information for identifying the terminal device, and
  - second identification information for identifying a user of the terminal device to the server;
- receiving a second image associated with the identifier of the marker image and the at least one of the first identification information and the second identification information from the server, the second image being variably set depending on at least one of an information clearance level of the terminal device and an information clearance level of the user of the terminal device;
- superimposing the second image over the first image to cause the display to collectively display the second image and the first image while the recording medium is being captured; and
- setting a number of times the extracting, the transmitting, the receiving, and the superimposing are repeated based on a computing capability of the circuitry of the terminal device.

20. The method of claim 19, wherein the setting includes setting the number of times based on a corresponding designation.

* * * * *